(12) United States Patent
Zhu

(10) Patent No.: US 11,178,125 B2
(45) Date of Patent: Nov. 16, 2021

(54) WIRELESS NETWORK CONNECTION METHOD, WIRELESS ACCESS POINT, SERVER, AND SYSTEM

(71) Applicant: TENCENT TECHNOLOGY (SHENZHEN) COMPANY LIMITED, Shenzhen (CN)

(72) Inventor: Ge Zhu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 272 days.

(21) Appl. No.: 16/044,202

(22) Filed: Jul. 24, 2018

(65) Prior Publication Data
US 2018/0332471 A1    Nov. 15, 2018

Related U.S. Application Data

(63) Continuation of application No. PCT/CN2017/082049, filed on Apr. 26, 2017.

(30) Foreign Application Priority Data

May 5, 2016  (CN) .......................... 201610292952.4

(51) Int. Cl.
*H04W 76/10* (2018.01)
*H04W 12/0431* (2021.01)
(Continued)

(52) U.S. Cl.
CPC ........ *H04L 63/061* (2013.01); *H04L 63/0876* (2013.01); *H04W 12/041* (2021.01);
(Continued)

(58) Field of Classification Search
CPC .. H04L 63/061; H04L 63/0876; H04W 12/06; H04W 12/04; H04W 76/10
(Continued)

(56) References Cited

U.S. PATENT DOCUMENTS 7,263,076 B1 * 8/2007 Leibovitz .............. H04W 12/50
                                                        370/310
7,293,289 B1 * 11/2007 Loc ..................... H04L 63/1416
                                                        726/23
(Continued)

FOREIGN PATENT DOCUMENTS

CN         1399490 A        2/2003
CN        104244248       * 12/2014 ............. H04L 29/12
(Continued)

OTHER PUBLICATIONS

Steve Watts, "Secure authentication is the only solution for vulnerable public wifi," Jan. 2016, Computer Fraud and Security, pp. 18-20 (Year: 2016).*

(Continued)

*Primary Examiner* — Farid Homayounmehr
*Assistant Examiner* — Thanh T Le
(74) *Attorney, Agent, or Firm* — Anova Law Group, PLLC

(57) ABSTRACT

A wireless network connection method is provided. The method includes: receiving, from a user terminal, an access request to a wireless access point, the access request including a media access control MAC address of the user terminal; sending, by the wireless access point, a key query request to an authentication server, the key query request including the MAC address; and receiving a key query result corresponding to the MAC address of the user terminal if the wireless access point is a trusted wireless access point. The method further includes obtaining a first authentication key corresponding to the MAC address of the user terminal according to the key query result; and negotiating with the user terminal, according to the first authentication key and a second authentication key, to establish an encrypted wireless network connection. The second authentication key is gen- (Continued)

erated by the user terminal corresponding to the MAC address.

22 Claims, 15 Drawing Sheets

(51) Int. Cl.
    *H04W 12/041*    (2021.01)
    *H04W 12/06*    (2021.01)
    *H04W 12/08*    (2021.01)
    *H04L 29/06*    (2006.01)

(52) U.S. Cl.
    CPC ....... *H04W 12/0431* (2021.01); *H04W 12/06* (2013.01); *H04W 12/08* (2013.01); *H04W 76/10* (2018.02)

(58) Field of Classification Search
    USPC .......................................................... 726/7
    See application file for complete search history.

(56) References Cited

U.S. PATENT DOCUMENTS

| | | | |
|---|---|---|---|
| 7,325,246 B1* | 1/2008 | Halasz | H04W 12/0431 726/2 |
| 7,373,508 B1* | 5/2008 | Meier | H04W 12/065 713/168 |
| 7,716,723 B1* | 5/2010 | Taylor | H04L 63/08 726/7 |
| 7,788,705 B2* | 8/2010 | Bruestle | H04W 12/06 726/4 |
| 7,870,389 B1* | 1/2011 | Leung | H04L 9/16 713/168 |
| 8,726,022 B2* | 5/2014 | Tie | H04L 63/0869 713/169 |
| 8,793,776 B1* | 7/2014 | Jackson | H04L 63/0853 726/7 |
| 8,990,891 B1* | 3/2015 | Chickering | H04L 63/0876 726/3 |
| 2002/0157090 A1* | 10/2002 | Anton, Jr. | H04L 67/34 717/178 |
| 2005/0144459 A1* | 6/2005 | Qureshi | H04L 63/04 713/176 |
| 2006/0171540 A1* | 8/2006 | Lee | H04L 63/062 380/277 |
| 2007/0121947 A1* | 5/2007 | Sood | H04L 63/061 380/277 |
| 2008/0130579 A1* | 6/2008 | Kurita | H04W 8/18 370/331 |
| 2008/0247368 A1* | 10/2008 | Uppala | H04L 63/061 370/338 |
| 2009/0287922 A1* | 11/2009 | Herwono | H04L 63/0853 713/155 |
| 2010/0332822 A1* | 12/2010 | Liu | H04L 63/08 713/151 |
| 2011/0055561 A1* | 3/2011 | Lai | H04L 9/083 713/168 |
| 2011/0243058 A1* | 10/2011 | Yamada | H04W 12/06 370/315 |
| 2012/0180114 A1* | 7/2012 | Huang | H04L 61/103 726/5 |
| 2013/0019298 A1* | 1/2013 | Jover Segura | H04L 63/1466 726/7 |
| 2013/0137402 A1* | 5/2013 | Ergen | H04W 12/0431 455/411 |
| 2013/0189953 A1* | 7/2013 | Mathews | H04L 12/28 455/411 |
| 2013/0190018 A1* | 7/2013 | Mathews | H04W 4/023 455/456.6 |
| 2013/0301607 A1* | 11/2013 | McCann | H04W 12/069 370/331 |
| 2014/0068252 A1* | 3/2014 | Maruti | H04L 9/0866 713/162 |
| 2014/0136844 A1* | 5/2014 | Ding | H04L 63/06 713/168 |
| 2014/0235167 A1* | 8/2014 | Jung | H04W 76/10 455/41.2 |
| 2015/0005022 A1* | 1/2015 | El-Refaey | H04W 16/14 455/509 |
| 2015/0026458 A1* | 1/2015 | Naslund | H04L 63/0884 713/155 |
| 2015/0067782 A1* | 3/2015 | Choi | H04L 63/10 726/3 |
| 2015/0229475 A1* | 8/2015 | Benoit | G06F 21/34 713/168 |
| 2015/0229669 A1* | 8/2015 | Xin | H04L 67/10 726/23 |
| 2015/0327065 A1* | 11/2015 | Mildh | H04W 48/02 455/411 |
| 2016/0021610 A1* | 1/2016 | Wan | H04L 63/0876 370/329 |
| 2016/0044009 A1* | 2/2016 | Hebron | H04L 63/20 713/171 |
| 2016/0080380 A1* | 3/2016 | Dawoud | H04L 9/3265 713/156 |
| 2016/0087954 A1* | 3/2016 | Zhang | H04W 12/06 726/6 |
| 2016/0105514 A1* | 4/2016 | Bahn | H04W 4/203 726/4 |
| 2016/0269403 A1* | 9/2016 | Koutenaei | H04L 63/107 |
| 2016/0286585 A1* | 9/2016 | Choi | H04W 12/06 |
| 2017/0339558 A1* | 11/2017 | Vanderveen | H04W 12/041 |
| 2018/0007551 A1* | 1/2018 | Wang | H04W 12/062 |
| 2018/0352490 A1* | 12/2018 | Hu | H04W 12/0433 |
| 2019/0028475 A1* | 1/2019 | Back | H04L 47/20 |
| 2019/0053044 A1* | 2/2019 | Cho | H04W 76/11 |

FOREIGN PATENT DOCUMENTS

| | | |
|---|---|---|
| CN | 104244248 A | 12/2014 |
| CN | 104854893 A | 8/2015 |
| CN | 105554747 A | 5/2016 |

OTHER PUBLICATIONS

The World Intellectual Property Organization (WIPO) International Search Report for PCT/CN2017/082049 dated Aug. 1, 2017 5 Pages (inclduing translation).

* cited by examiner

WIRELESS NETWORK CONNECTION METHOD, WIRELESS ACCESS POINT, SERVER, AND SYSTEM

RELATED APPLICATION

This application claims priority to PCT Application No. PCT/CN2017/082049, filed on Apr. 26, 2017, which claims priority to Chinese Patent Application No. 201610292952.4, filed with the Chinese Patent Office on May 5, 2016 and entitled "WIRELESS NETWORK CONNECTION METHOD, APPARATUS, AND SYSTEM." The two applications are incorporated herein by reference in their entirety.

FIELD OF THE TECHNOLOGY

Embodiments of the present disclosure relate to the field of network security, and in particular, to a wireless network connection method, a wireless access point, a server, and a related system.

BACKGROUND OF THE DISCLOSURE

User terminals such as computers and smart phones are widely used. A wireless network has become an important way for user terminals to access the Internet. Often, the wireless network is a Wireless-Fidelity (Wi-Fi) network. As an example, most commercial or public spaces provide public Wi-Fi networks.

A user terminal often accesses public Wi-Fi networks in one of the following manners: accessing the network using no password, accessing the network using a verification code, and accessing the network using a single password. The user terminal is a terminal that can search for and connect to the Wi-Fi network. When accessing a Wi-Fi network without a password, after obtaining a service set identifier (SSID) of the public Wi-Fi, the user terminal sends an access request to a wireless access point, and the wireless access point directly allows the user terminal to access the public Wi-Fi without performing any verification. When accessing a Wi-Fi network with a verification code, the user terminal needs to obtain an SSID of the public Wi-Fi and a verification code when accessing the public Wi-Fi, and sends an access request carrying the verification code and the SSID to the wireless access point. The wireless access point verifies the verification code and the SSID, and allows the user terminal to access the public Wi-Fi network after verification. The verification code usually has an expiration time, for example, in 60 s. When accessing a Wi-Fi network using a single password, when accessing the public Wi-Fi, the user terminal obtains in advance an SSID and a connection password of the public Wi-Fi, and sends an access request with the SSID and the connection password to the wireless access point. The wireless access point verifies the SSID and the connection password, and allows, after the verification performed by the wireless access point succeeds, the user terminal to access the public Wi-Fi network. The connection password is often valid permanently.

However, a hacker may set up a fake public Wi-Fi network and the fake public Wi-Fi may be set to have hardware information such as an SSID that is the same as the actual public Wi-Fi network. If a user terminal accesses the fake public Wi-Fi using any of the foregoing methods, data transmitted by the user terminal to the fake public Wi-Fi, and even data within the user terminal are easily leaked, and user data security would be compromised.

SUMMARY

Embodiments of the present disclosure provide a wireless network connection method, a wireless access point, a server, and a system. The technical solutions are as follows:

According to a first aspect of the embodiments of the present disclosure, a wireless network connection method is provided. The wireless network connection method includes the steps of: receiving, from a user terminal, an access request to a wireless access point, the access request including a media access control MAC address of the user terminal; sending, by the wireless access point, a key query request to an authentication server, the key query request including the MAC address of the user terminal; and receiving, from the authentication server, a key query result corresponding to the MAC address of the user terminal to the wireless access point if the wireless access point is a trusted wireless access point. The method further includes the steps of obtaining, by the wireless access point, a first authentication key corresponding to the MAC address of the user terminal according to the key query result; and negotiating, by the wireless access point, with the user terminal, according to the first authentication key and a second authentication key, to establish an encrypted wireless network connection. The second authentication key is generated by the user terminal corresponding to the MAC address of the user terminal.

According to a second aspect of the embodiments of the present disclosure, a wireless network connection apparatus is provided. The apparatus is applied on a wireless access point and includes a memory and a processor coupled to the memory. The processor is configured to perform: receiving an access request sent by a user terminal, the access request including a media access control MAC address of the user terminal; sending a key query request to an authentication server, the key query request including the MAC address of the user terminal; and receiving a key query result that corresponds to the MAC address of the user terminal from the authentication server. The key query result is sent by the authentication server after verifying that a wireless access point is a trusted wireless access point. The processor is also configured to perform: obtaining an authentication key corresponding to the MAC address of the user terminal according to the key query result; and negotiating with the user terminal according to respectively possessed authentication keys to establish an encrypted wireless network connection.

According to a third aspect of the embodiments of the present disclosure, a non-transitory computer-readable storage medium is provided. The storage medium stores computer program instructions executable by at least one processor. The computer program instructions can cause at least one processor to: receive the access request sent by a user terminal, the access request including a media access control MAC address of the user terminal; send a key query request to the authentication server, the key query request including the MAC address of the user terminal; receive a key query result that corresponds to the MAC address of the user terminal from the authentication server, the key query result being sent by the authentication server after verifying that a wireless access point is a trusted wireless access point; obtain an authentication key corresponding to the MAC address of the user terminal according to the key query result; and negotiate with the user terminal according to respectively possessed authentication keys to establish an encrypted wireless network connection.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show merely some embodiments of the present disclosure, and a person of ordinary skill in the technology may still derive other drawings from these accompanying drawings without creative efforts.

DESCRIPTION OF EMBODIMENTS

Figure 1:
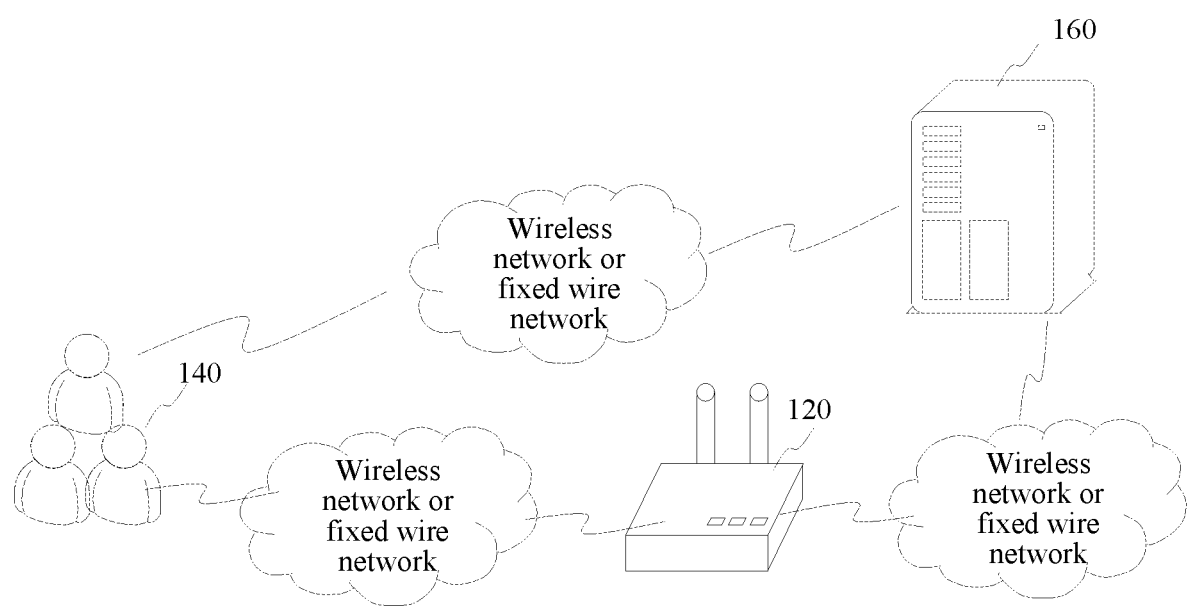
FIG. 1 is a schematic structural diagram of a wireless network connection system according to an exemplary embodiment of the present disclosure.

To make the objectives, technical solutions, and advantages of the present disclosure clearer, the following further describes implementations of the present disclosure in detail with reference to the accompanying drawings.

For ease of understanding, some technical concepts involved in the embodiments of the present disclosure are first described.

Public key and private key: A public key is a key that is public. A public key does not need to be kept confidential, and may be obtained by a decrypting party by various means. A private key is a key that is held only by an encrypting party and needs to be kept confidential. One public key may correspond to one private key, and the public key and the private key may jointly form an asymmetrical encryption. In the asymmetrical encryption, information encrypted by using the public key can be decrypted only by using the corresponding private key, and information encrypted by using the private key can be decrypted only by using the corresponding public key. That is, different keys are used for encryption and decryption.

For example, if A intends to send encrypted information to B. A first needs to obtain a public key corresponding to B, then encrypts the to-be-sent information by using the public key corresponding to B, and sends the encrypted information to B. After receiving the encrypted information sent by A, B needs to use a private key corresponding to B to decrypt the encrypted information, to obtain content in the encrypted information. Because only B has the private key corresponding to B, the encrypted information sent by A is secure.

Session key: A session key is a key possessed by both a decrypting party and an encrypting party, and needs to be kept confidential. Encrypting by using the session key is a symmetrical encryption manner. In symmetrical encryption, information encrypted by the encrypting party by using the session key can be decrypted only by using the same session key. That is, a same key is used for encryption and decryption.

Between a wireless access point and an authentication server, identity authentication performed by the authentication server on the wireless access point is implemented by using a session key of an application layer; and verification performed by the authentication server on the wireless access point and information exchange after the verification is implemented by means of combining the session key of the application layer with a public key and a private key of a transmission layer.

As shown in Table 1, in a process of the identity authentication performed by the authentication server on the wireless access point, an identity authentication process is implemented in a data layer (an APP.EN layer and an APP.DATA layer in Table 1) by using an encrypted session key of an application layer (an SSL layer in Table 1); and in a process of the verification performed by the authentication server on the wireless access point and the information exchange after the verification, information is encrypted by means of combining the session key of the application layer with a public key and a private key of a transmission layer (a TCP/IP layer in Table 1), and the verification and the information exchange after the verification are implemented in the data layer.

TABLE 1

| Wireless access point | Authentication server |
|---|---|
| | APP.DATA layer |
| | APP.EN layer |
| | SSL layer |
| | TCP/IP layer |

In embodiments of the present disclosure, a user terminal may sends an access request to a wireless access point. The wireless access point may send a key query request to an authentication server. The authentication server may verify, after receiving the key query request, whether the wireless access point is a trusted wireless access point, and the authentication server may send a key query result corresponding to the MAC address of the user terminal to the wireless access point when the wireless access point is a trusted wireless access point. The wireless access point may obtain an authentication key corresponding to the MAC address of the user terminal according to the key query result. The user terminal may generate the authentication key corresponding to the MAC address of the user terminal. The wireless access point may negotiate with the user terminal according to the respectively possessed authentication keys to establish an encrypted wireless network connection. Identity authentication may be performed on the wireless access point by using the authentication server, and only the trusted wireless access point can obtain the authentication key corresponding to the MAC address of the user terminal, and therefore establish the encrypted wireless network connection with the user terminal according to the authentication key. A fake public Wi-Fi would not be a trusted wireless access point, therefore, the user terminal would not establish a wireless network connection with the fake public Wi-Fi. Embodiments of the present disclosure thereby improve security of data transmitted by the user terminal and data within the user terminal.

Referring to FIG. 1, FIG. 1 is a schematic structural diagram of a wireless network connection system according to an exemplary embodiment of the present disclosure. The wireless network connection system includes: a wireless access point 120, a user terminal 140, and an authentication server 160. The wireless access point 120 may be a general term for devices providing a wireless network access service, for example, a router, a Wi-Fi hotspot, and a wireless gateway. In this embodiment of the present disclosure, the wireless access point 120 is described by using a router as an example. Before the wireless access point 120 establishes a wireless network connection to the user terminal 140, the authentication server 160 may perform identity authentication on the wireless access point 120. The wireless access point 120 establishes a connection to the authentication server 160 by using a wireless network or a fixed wire network. The manner of communication between the wireless access point 120 and the authentication server 160 is not limited in this embodiment of the present disclosure.

The user terminal 140 may be a mobile phone, a tablet computer, an e-book reader, a moving picture experts group audio layer III (MP3) player, a moving picture experts group audio layer IV (MP4) player, a portable laptop computer, a desktop computer, or the like. Optionally, an application program having a barcode scanning function, for example, an instant messaging application, a social application, a browser application, or a wireless Internet access program may be installed in the user terminal 140. The user terminal 140 may establish a connection to the authentication server 160 by using a wireless network or a fixed wire network. Optionally, the user terminal 140 may send a registration request to the authentication server 160 through an independent channel, and the authentication server 160 may allocate a unique user name and password to the user terminal 140 according to the registration request sent by the user terminal 140. The independent channel may be a communication channel bypassing the wireless access point, for example, a 2G network, or a 3G network. A manner of communication between the user terminal 140 and the authentication server 160 is not limited in this embodiment of the present disclosure.

The authentication server 160 stores a trusted identifier, a user name and password that correspond to each user terminal 140, and a MAC address of the user terminal 140. The trusted identifier is an identifier of a wireless access point on which identity authentication performed by the authentication server succeeds. The authentication server 160 may be one server, a server cluster including multiple servers, or a cloud computing center.

Figure 2:
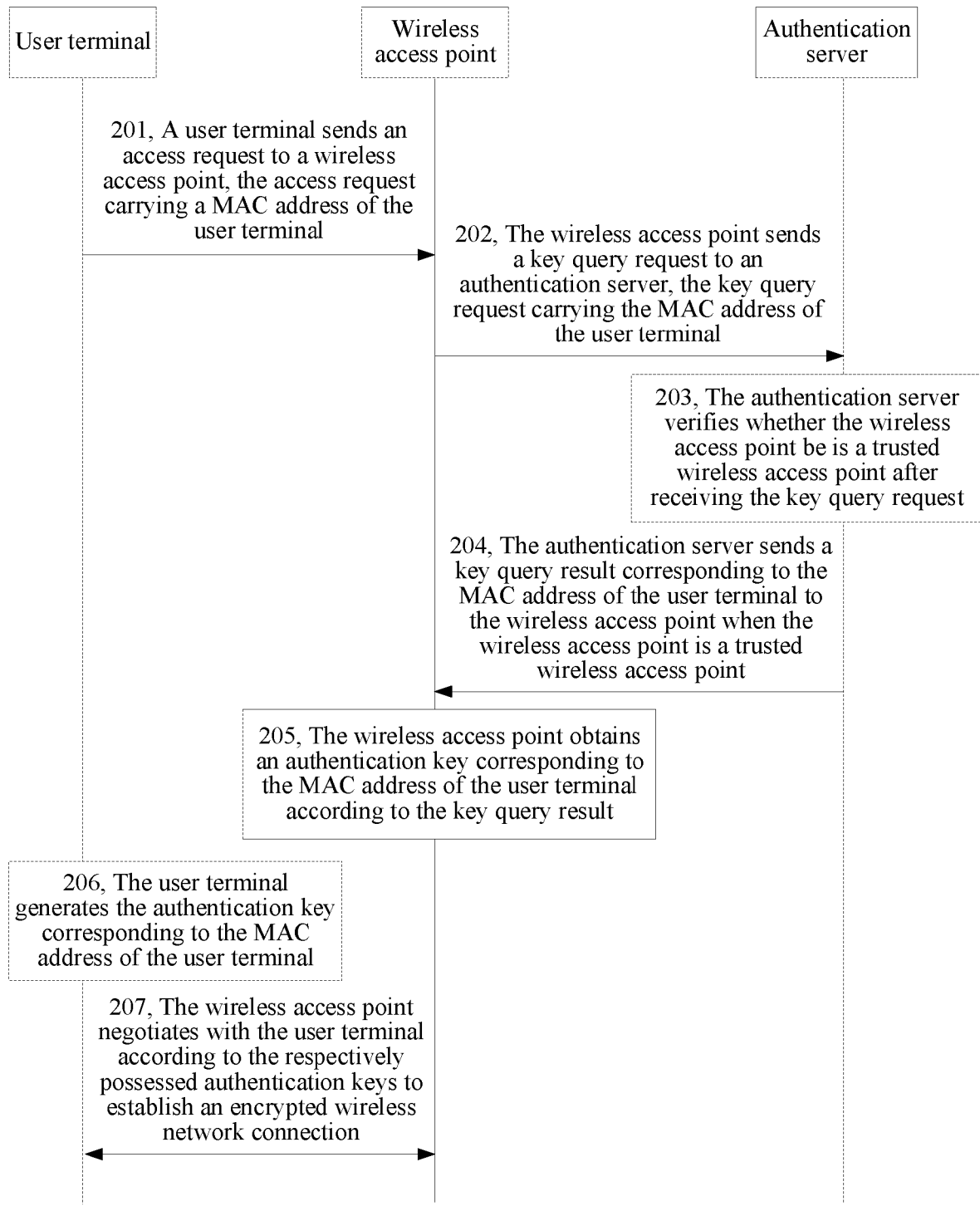
FIG. 2 is a flowchart of a wireless network connection method according to an embodiment of the present disclosure.

Referring to FIG. 2, FIG. 2 is a flowchart of a wireless network connection method according to an embodiment of the present disclosure. This embodiment is described by using an example in which the wireless network connection method is applied to the wireless network access system shown in FIG. 1. The method includes the following steps:

Step S201: A user terminal sends an access request to a wireless access point, the access request carrying a MAC address of the user terminal.

The user terminal obtains in advance the MAC address of the user terminal, and adds the obtained MAC address to the access request to send to the wireless access point. Optionally, the user terminal does not obtain the MAC address of the user terminal, but an operating system of the user terminal directly adds the MAC address to the access request to send to the wireless access point. Correspondingly, the wireless access point receives the access request sent by the user terminal.

Step S202: The wireless access point sends a key query request to an authentication server, the key query request carrying the MAC address of the user terminal.

After receiving the access request sent by the user terminal, the wireless access point obtains the MAC address in the access request, and adds the obtained MAC address and an identifier of the wireless access point to the key query request to send to the authentication server. Correspondingly, the authentication server receives the key query request sent by the wireless access point.

Step S203: The authentication server verifies whether the wireless access point is a trusted wireless access point after receiving the key query request.

Step S204: The authentication server sends a key query result corresponding to the MAC address of the user terminal to the wireless access point when the wireless access point is a trusted wireless access point.

The authentication server queries for and generates the corresponding key query result according to the MAC address in the key query request when the wireless access point is a trusted wireless access point. The authentication server generates the corresponding key query result according to the found MAC address when finding that the authentication server stores in advance the MAC address carried in the key query request. For example, the generated key query result is: "A MAC address exists, and a corresponding authentication key is dbaf12". The authentication server generates the corresponding key query result according to the MAC address when finding that the MAC address carried in the key query request does not exist in the authentication server. For example, the generated key query result is: "A MAC address does not exist, and a corresponding authentication key cannot be generated". Correspondingly, the wireless access point receives the key query result sent by the authentication server.

Step S205: The wireless access point obtains an authentication key corresponding to the MAC address of the user terminal according to the key query result.

Step S206: The user terminal generates the authentication key corresponding to the MAC address of the user terminal.

Step 207: The wireless access point negotiates with the user terminal according to the respectively possessed authentication keys to establish an encrypted wireless network connection.

Based on the above, in the wireless network access method provided in this embodiment, a user terminal sends an access request to a wireless access point; the wireless access point sends a key query request to an authentication server; the authentication server verifies whether the wireless access point is a trusted wireless access point after receiving the key query request, and the authentication server sends a key query result corresponding to the MAC address of the user terminal to the wireless access point when the wireless access point is a trusted wireless access point; the wireless access point obtains an authentication key corresponding to the MAC address of the user terminal according to the key query result; the user terminal generates the authentication key corresponding to the MAC address of the user terminal; and the wireless access point negotiates with the user terminal according to the respectively possessed authentication keys to establish an encrypted wireless network connection. Identity authentication is performed on the wireless access point by using the authentication server, and only the trusted wireless access point can obtain the authentication key corresponding to the MAC address of the user terminal, and therefore, establish the encrypted wireless network connection with the user terminal according to the authentication key. A fake public Wi-Fi would not be a trusted wireless access point, therefore, the user terminal would not establish a wireless network connection with the fake public Wi-Fi, thereby improving security of data transmitted by the user terminal and data within the user terminal. It is noted that the steps related to the side of the authentication server in the foregoing embodiment may be independently implemented as the wireless network connection method from the side of the authentication server, and the steps related to the side of the wireless access point may be independently implemented as the wireless network connection method from the side of the wireless access point.

Figure 3A:
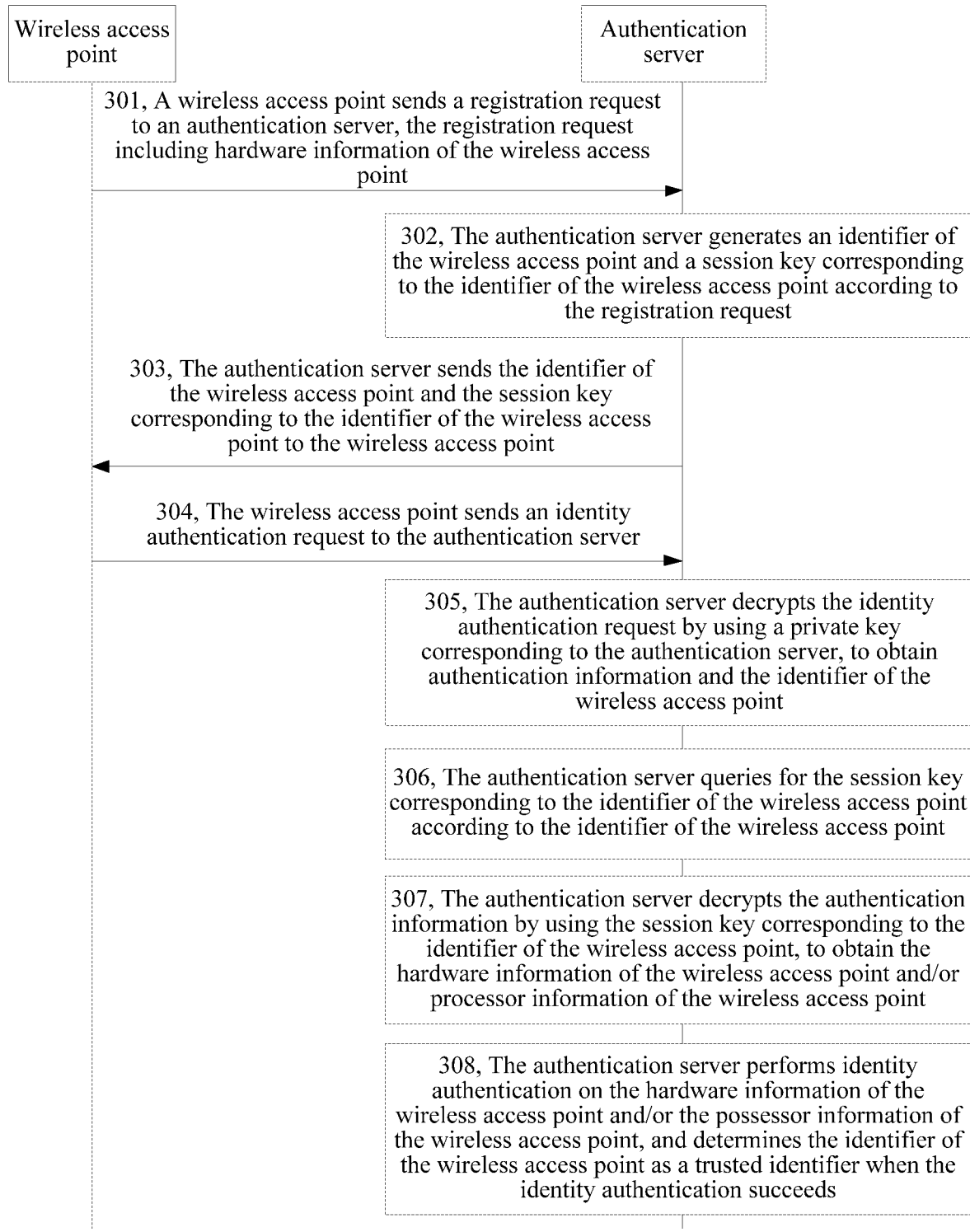
FIG. 3A is a flowchart of performing, by an authentication server, identity authentication on a wireless access point according to an embodiment of the present disclosure.

The wireless network connection method in this embodiment mainly includes three phases. The first phase includes a process in which the wireless access point is registered on the authentication server and the authentication server performs the identity authentication on the wireless access point; the second phase includes a process in which the authentication server allocates a user name and password to the user terminal and stores the MAC address of the user terminal; and the third phase includes a process of the wireless network connection. In this embodiment, each phase is described in detail by using three different embodiments according to the three different phases. The specific embodiments are shown in the following. Referring to FIG. 3A, FIG. 3A is a flowchart of performing, by an authentication server, identity authentication on a wireless access point according to an embodiment of the present disclosure.

This embodiment is described by using an example in which the identity authentication process is applied to the wireless network access system shown in FIG. 1. The method includes the following steps:

Step S301: A wireless access point sends a registration request to an authentication server, the registration request including hardware information of the wireless access point.

The wireless access point first needs to be registered on the authentication server before the wireless access point is used. The wireless access point needs to send the hardware information of the wireless access point to the authentication server when being registered on the authentication server. Optionally, the hardware information corresponding to the wireless access point may include: an SSID of the wireless access point, a basic service set identifier (BSSID) of the wireless access point, a MAC address of the wireless access point, a network address of the wireless access point, a gateway Internet Protocol (IP) of the wireless access point, or the like. The SSID of the wireless access point and the BSSID of the wireless access point are usually combined for use, and are used as an identifier of a wireless network corresponding to the wireless access point. For example, as shown in Table 2, when the wireless access point includes three wireless networks, there are three SSIDs of the wireless access point and three BSSIDs of the wireless access point.

TABLE 2

| Wireless access point | SSID 1 | BSSID 1 | Wireless network 1 |
|---|---|---|---|
| | SSID 2 | BSSID 2 | Wireless network 2 |
| | SSID 3 | BSSID 2 | Wireless network 3 |

As shown in Table 2, an SSID 1 and a BSSID 1 represent an identifier of a wireless network 1 corresponding to the wireless access point; an SSID 2 and a BSSID 2 represent an identifier of a wireless network 2 corresponding to the wireless access point; and an SSID 3 and a BSSID 3 represent an identifier of a wireless network 3 corresponding to the wireless access point. The network address of the wireless access point is a network address provided for a local area network, therefore multiple wireless access points communicate by using the network address; and the gateway IP of the wireless access point is an IP address provided for other networks other than the local area network, so as to establish communications with the other networks. That is, the network address of the wireless access point is used for internal network communications, and the gateway IP of the wireless access point is used for external network communications. Correspondingly, the authentication server receives the registration request sent by the wireless access point.

Step S302: The authentication server generates an identifier of the wireless access point and a session key corresponding to the identifier of the wireless access point according to the registration request.

After receiving the registration request, the authentication server obtains an identifier of a wireless network corresponding to the wireless access point carried in the registration request, and generates the identifier of the wireless access point and the session key corresponding to the identifier of the wireless access point according to the obtained identifier of the wireless network. Both the identifier of the wireless access point and the session key corresponding to the identifier of the wireless access point can uniquely identify the wireless access point. Optionally, the authentication server stores the identifier of the wireless access point and the session key corresponding to the identifier of the wireless access point, and marks the identifier of the wireless access point as untrusted. Optionally, when storing the identifier of the wireless access point and the session key corresponding to the identifier of the wireless access point, the authentication server stores a correspondence between the two.

Step S303: The authentication server sends the identifier of the wireless access point and the session key corresponding to the identifier of the wireless access point to the wireless access point.

Figure 3B:
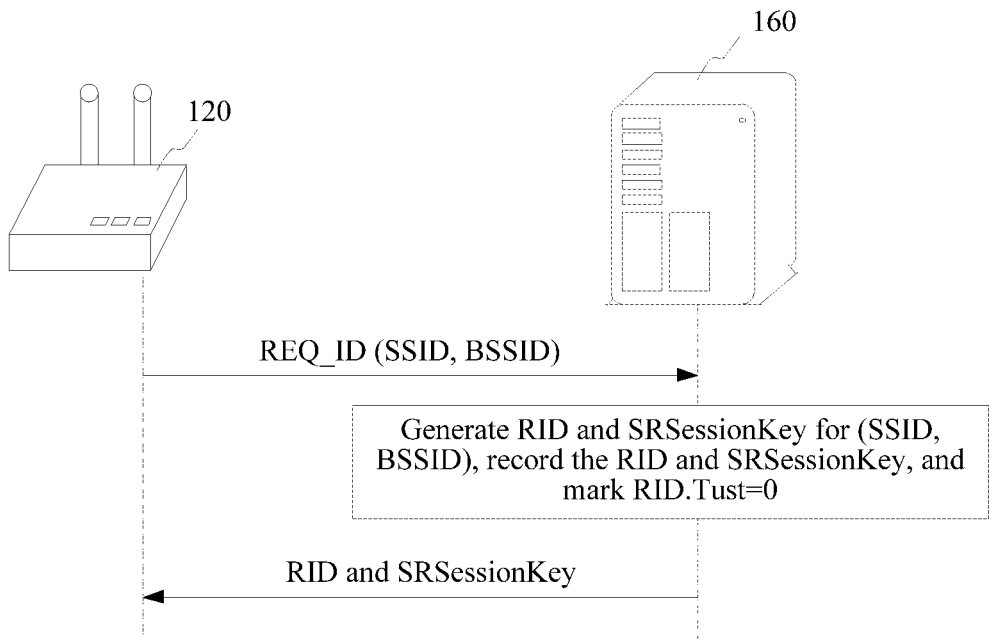
FIG. 3B is a schematic diagram of a process in which a wireless access point is registered with an authentication server according to an embodiment of the present disclosure.

The authentication server sends back the generated identifier of the wireless access point and the session key corresponding to the identifier of the wireless access point to the wireless access point after generating the identifier of the wireless access point and the session key corresponding to the identifier of the wireless access point. Correspondingly, the wireless access point receives the identifier of the wireless access point and the session key corresponding to the identifier of the wireless access point sent by the authentication server. In an example, a process in which a wireless access point 120 is registered on an authentication server 160 is shown in FIG. 3B. The wireless access point 120 sends a registration request to the authentication server 160 when first logging on. In FIG. 3B, an REQ_ID (SSID, BSSID) represents the registration request sent by the wireless access point 120 to the authentication server 160. The registration request carries an SSID and a BSSID of a wireless network corresponding to the wireless access point 120. The authentication server 160 generates an RID and an SRSessionKey for the (SSID, BSSID) after receiving the registration request REQ_ID (SSID, BSSID). The RID represents an identifier of the wireless access point 120 and the SRSessionKey represents a session key corresponding to the identifier of the wireless access point 120. The authentication server 160 records the RID and the SRSessionKey in a database of the wireless access point 120, and marks RID.Tust=0. RID.Tust=0 represents that the authentication server 160 currently does not trust the wireless access point 120. The authentication server 160 sends back the generated RID and SRSessionKey to the wireless access point 120.

Step 304: The wireless access point sends an identity authentication request to the authentication server.

The identity authentication request carries authentication information and the identifier of the wireless access point, both the authentication information and the identifier of the wireless access point are encrypted by using a public key corresponding to the authentication server, and the authentication information includes at least hardware information and/or possessor information of the wireless access point. Optionally, the authentication information is information through which the wireless access point performs encryption by using the session key corresponding to the identifier of the wireless access point. Optionally, the wireless access point directly sends the hardware information and/or possessor information of the wireless access point to the authentication server; alternatively, the wireless access point only sends the hardware information of the wireless access point to the authentication server, and the possessor information of the wireless access point is indirectly sent by a management terminal to the authentication server. In this embodiment, a manner of sending the authentication information to the authentication server is not specifically limited. In this embodiment, an example in which the wireless access point sends the hardware information and processor information of the wireless access point to the authentication server is used for description. Optionally, the wireless access point first obtains the public key corresponding to the authentication server before sending the identity authentication request to the authentication server. Optionally, the public key corresponding to the authentication server is stored in firmware of the wireless access point. The wireless access point directly obtains the public key corresponding to the authentication server from the firmware. The wireless access point establishes an encrypted channel to the authentication server after obtaining the public key corresponding to the authentication server. The wireless access point adds the authentication information and the identifier of the wireless access point to the identity authentication request by using the encrypted channel to send to the authentication server.

The encrypted channel means that all information sent by the wireless access point to the authentication server is encrypted by using the public key corresponding to the authentication server. For example, the identity authentication request is encrypted by using the public key corresponding to the authentication server; after receiving the encrypted information sent by the wireless access point, the authentication server needs to perform decryption by using a private key of the authentication server to obtain the information thereof; and all information sent by the authentication server to the wireless access point is encrypted by using the session key corresponding to the identifier of the wireless access point, and after receiving the encrypted information sent by the authentication server, the wireless access point needs to decrypt the information by using the session key corresponding to the identifier of the wireless access point to obtain the information thereof.

The processor information of the wireless access point may include information such as an administrator account identifier, an administrator name, an administrator contact telephone, a merchant name, a merchant registration name, a merchant address, a merchant registration address, and a merchant telephone. Optionally, the wireless access point may separately send the authentication information and the identifier of the wireless access point to the authentication server. For example, the wireless access point first encrypts the identifier of the wireless access point by using the public key corresponding to the authentication server and sends the encrypted identifier of the wireless access point to the authentication server, and then encrypts the authentication information by using the session key corresponding to the identifier of the wireless access point and then sends the encrypted authentication information to the authentication server. The authentication server first performs decryption according to the private key corresponding to the authentication server to obtain the identifier of the wireless access point, and then decrypts the encrypted authentication information by using the session key corresponding to the identifier of the wireless access point to obtain the authentication information. Correspondingly, the authentication server receives the identity authentication request sent by the wireless access point.

In this embodiment, an example in which the wireless access point encrypts the identity authentication request by using the public key corresponding to the authentication server, the identity authentication request including the authentication information and the identifier of the wireless access point; and encrypts the authentication information by using session key corresponding to the identifier of the wireless access point is used for description.

Step 305: The authentication server decrypts the identity authentication request by using a private key corresponding to the authentication server, to obtain authentication information and the identifier of the wireless access point.

After receiving the identity authentication request sent by the wireless access point, the authentication server decrypts the identity authentication request by using the private key corresponding to the authentication server, to obtain the authentication information and the identifier of the wireless access point that are carried in the identity authentication request.

Step 306: The authentication server queries for the session key corresponding to the identifier of the wireless access point according to the identifier of the wireless access point.

After performing decryption by using the private key corresponding to the authentication server, to obtain the authentication information and the identifier of the wireless access point, the authentication server queries the authentication server for the session key corresponding to the identifier of the wireless access point. The identifier of the wireless access point and the session key corresponding to the identifier of the wireless access point are stored by the authentication server when the wireless access point is registered.

Step 307: The authentication server decrypts the authentication information by using the session key corresponding to the identifier of the wireless access point, to obtain the hardware information of the wireless access point and/or processor information of the wireless access point.

After finding the session key corresponding to the identifier of the wireless access point, the authentication server decrypts the authentication information by using the session key corresponding to the identifier of the wireless access point, to obtain the hardware information of the wireless access point and/or processor information of the wireless access point.

Step 308: The authentication server performs identity authentication on the hardware information of the wireless access point and/or the possessor information of the wireless access point, and determines the identifier of the wireless access point as a trusted identifier when the identity authentication succeeds.

After performing decryption to obtain the hardware information of the wireless access point and/or the possessor information of the wireless access point, the authentication server performs the identity authentication on the hardware information of the wireless access point and/or the possessor information of the wireless access point. Optionally, the identity authentication process is a manual review process. The identity authentication is to check whether the hardware information of the wireless access point and/or the possessor information of the wireless access point carried in the authentication information is correct or complete. After the identity authentication succeeds, the authentication server determines the identifier of the wireless access point as the trusted identifier, and stores the session key corresponding to the identifier of the wireless access point.

Optionally, the authentication server stores data identifying a set of trusted identifiers, and the set of trusted identifiers is a list of wireless access points on which the identity authentication succeeds and that is stored by the authentication server. That is, the corresponding wireless access points in the set of trusted identifiers are all wireless access points for which the identity authentication performed by the authentication server succeeds.

Exemplarily, the set of trusted identifiers is shown in the following Table 3:

TABLE 3

| Wireless access point | Identifier |
| --- | --- |
| Wireless access point A | ID 1 |
| Wireless access point B | ID 2 |
| Wireless access point C | ID 3 |
| Wireless access point D | ID 4 |

As shown in Table 3, an identifier of a wireless access point A is "ID 1"; an identifier of a wireless access point B is "ID 2"; an identifier of a wireless access point C is "ID 3"; and an identifier of a wireless access point D is "ID 4". Optionally, after the identity authentication succeeds, the authentication server determines the identifier of the wireless access point as the trusted identifier. The authentication server allows the user terminal to query the authentication server for the wireless access point, to authenticate whether the wireless access point is the trusted wireless access point according to the trusted identifier; and the authentication server allows the wireless access point to query the authentication server for an authentication key corresponding to the MAC address of the user terminal.

Figure 3C:
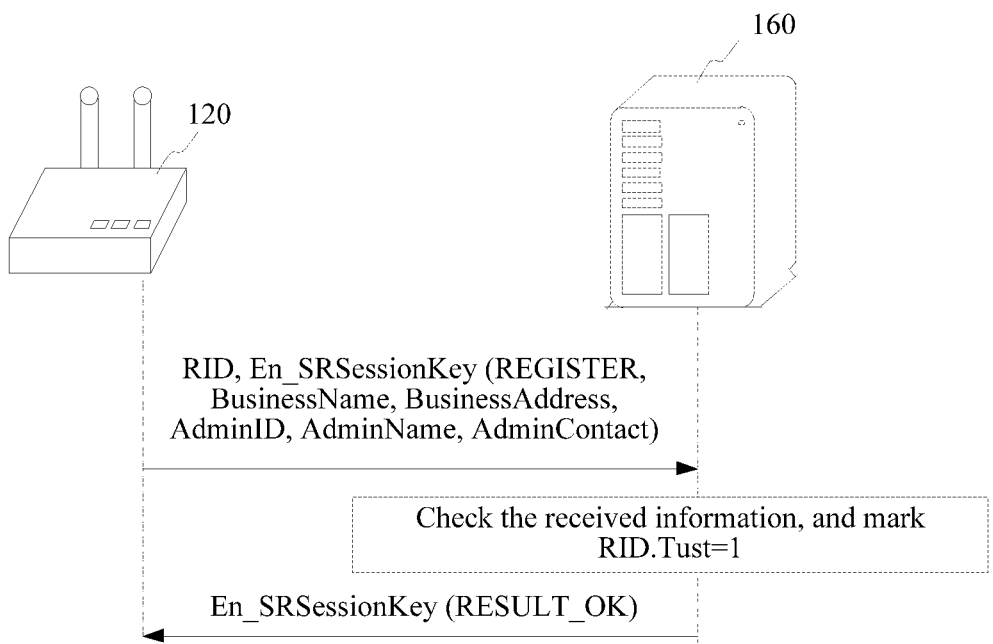
FIG. 3C is a schematic diagram of a process in which an authentication server performs identity authentication on a wireless access point according to an embodiment of the present disclosure.

In an example, a process in which a wireless access point 120 is authenticated by an authentication server 160 is shown in FIG. 3C. In FIG. 3C, the wireless access point 120 sends RID and En_SRSessionKey (REGISTER, BusinessName, BusinessAddress, AdminID, AdminName, AdminContact) to the authentication server 160. The RID represents an identifier of the wireless access point 120, and the En_SRSessionKey ( ) represents encrypting content in the corresponding parentheses by using an SRSessionKey, the REGISTER represents identity authentication, the BusinessName represents a merchant registration name, the BusinessAddress represents a merchant registration address, the AdminID represents an administrator account identifier, the AdminName represents an administrator name, and the AdminContact represents an administrator contact telephone. The authentication server 160 checks the received information, and marks RID.Tust=1. The RID.Tust=1 represents that the authentication server 160 determines the wireless access point 120 as the trusted wireless access point. The authentication server 160 sends back En_SRSessionKey (RESULT_OK) to the wireless access point 120, and the RESULT_OK represents that the identity authentication performed by the authentication server 160 succeeds.

Based on the above, in the process in which the authentication server performs the identity authentication on the wireless access point in this embodiment, only the trusted wireless access point that can be verified by the authentication server can perform the wireless network connection of the second phase and the third phase, therefore, the user terminal negotiates with the trusted wireless access point to establish the encrypted wireless network connection, thereby improving security of data transmitted by the user terminal and data within the user terminal.

First, a manner in which the wireless access point sends the identity authentication request to the authentication server may include the following three possible manners.

In a first possible implementation, the wireless access point directly sends the identity authentication request to the authentication server, the identity authentication request carrying the identifier of the wireless access point, and the hardware information of the wireless access point and/or the possessor information of the wireless access point. That is, the wireless access point directly sends plaintext of the identifier of the wireless access point, and the hardware information of the wireless access point and/or the possessor information of the wireless access point to the authentication server.

In a second possible implementation, the wireless access point encrypts the identity authentication request by using the public key corresponding to the authentication server and then sends the identity authentication request to the authentication server, the identity authentication request carrying the identifier of the wireless access point, and the hardware information of the wireless access point and/or the possessor information of the wireless access point.

In a third possible implementation, the wireless access point encrypts the identity authentication request by using the public key corresponding to the authentication server, the identity authentication request carrying authentication information and the identifier of the wireless access point; the authentication information being information through which the wireless access point performs encryption by using the session key corresponding to the identifier of the wireless access point; and the authentication information carrying the hardware information of the wireless access point and/or the possessor information of the wireless access point. That is, the wireless access point obtains the authentication information after encrypting the hardware information of the wireless access point and/or the possessor information of the wireless access point by using the session key corresponding to the identifier of the wireless access point; and then encrypts the identity authentication request carrying the authentication information and the identifier of the wireless access point by using the public key corresponding to the authentication server, and sends the identity authentication request to the authentication server.

Second, the steps related to the side of the authentication server in this embodiment may be independently implemented as the identity authentication process from the side of the authentication server, and the steps related to the side of the wireless access point may be independently implemented as the identity authentication process from the side of the wireless access point.

Figure 4A:
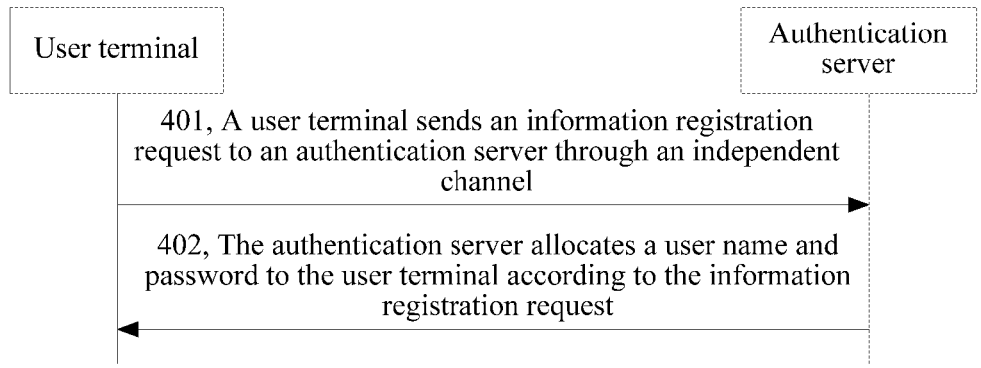
FIG. 4A is a flowchart of allocating, by an authentication server, a user name and password to a user terminal according to an embodiment of the present disclosure.

Referring to FIG. 4A, FIG. 4A is a flowchart of allocating, by an authentication server, a user name and password to a user terminal according to an embodiment of the present disclosure. This embodiment is described by using an example in which the allocation process is applied to the wireless network access system shown in FIG. 1. The method includes the following steps:

Step S401: A user terminal sends an information registration request to an authentication server through an independent channel.

The information registration request carries a MAC address of the user terminal, a coordinate address, and current time. Optionally, when the user terminal does not obtain the MAC address of the user terminal, the information registration request does not carry the MAC address of the user terminal. The coordinate address is an address on which the user terminal is located when sending the information registration request, and an objective of sending the coordinate address by the user terminal to the authentication server is to facilitating the authentication server recommending a trusted wireless access point within a range of the address on which the user terminal is located to the user terminal. The current time is time when the user terminal sends the information registration request, and an objective of sending the current time by the user terminal to the authentication server is to facilitating the authentication server obtaining time when the user terminal registers information, so as to compare the time with the current time when the user terminal requests to access the wireless access point. Optionally, the current time may be a current data or a current time point.

The independent channel is a communication channel through which the user terminal directly communicates with the authentication server, bypassing the wireless access point. For example, in a process in which the user terminal communicates with the authentication server, all information sent by the user terminal to the authentication server is encrypted by using the public key corresponding to the authentication server, after receiving the encrypted information sent by user terminal, the authentication server performs decryption by using a private key of the authentication server to obtain the information thereof; and all information sent by the authentication server to the user terminal is encrypted by using the private key corresponding to the authentication server, and after receiving the encrypted information sent by the authentication server, the user terminal needs to decrypt the information by using the public key corresponding to the authentication server to obtain the information thereof. Correspondingly, the authentication server receives the information registration request sent by the user terminal.

Step S402: The authentication server allocates a user name and password to the user terminal according to the information registration request.

After receiving the information registration request, the authentication server decrypts the information registration request by using the private key corresponding to the authentication server, to obtain the MAC address of the user terminal, the coordinate address, and the current time, and generates the corresponding user name and password according to the obtained information. Optionally, the authentication server stores a correspondence between the user name and password corresponding to the user terminal, the MAC address of the user terminal, the coordinate address, and the current time, and sends the user name and password to the user terminal. Optionally, the user name and password received by the user terminal is unknown to a user, and if the user wants to obtain the user name and password, the user needs to perform an viewing operation on the user name and password and then can know the user name and password. Optionally, when the user terminal uses an iOS system, the user terminal may not obtain the MAC address of the user terminal due to the limitation of the iOS system, and then the information registration request sent by the user terminal to the authentication server does not carry the MAC address of the user terminal. In this case, the authentication server sets the MAC address of the user terminal as empty. Exemplarily, the authentication server stores a correspondence between the user name, the password, the MAC address of the user terminal, the registration time, and the coordinate address, as shown in the following Table 4.

TABLE 4

| User name | Password | MAC address | Coordinate address (longitude, latitude) | Registration time |
|---|---|---|---|---|
| User A | Password 1 | MAC 1 | (120.3, 31.56) | 26, April |
| User B | Password 2 | Empty | (31.12, 121.26) | 25, April |
| User C | Password 3 | MAC 3 | (39.57, 116.19) | 20, April |

The authentication server randomly generates a corresponding user name and password for a user terminal according to right three columns in Table 4, and the authentication server allocates the randomly generated user name and password to the corresponding user terminal. Optionally, the user name and password allocated by the authentication server to the user terminal is unique. That is, each user terminal corresponds to a unique user name and password, and the user terminal is in a one-to-one correspondence with the user name.

Figure 4B:
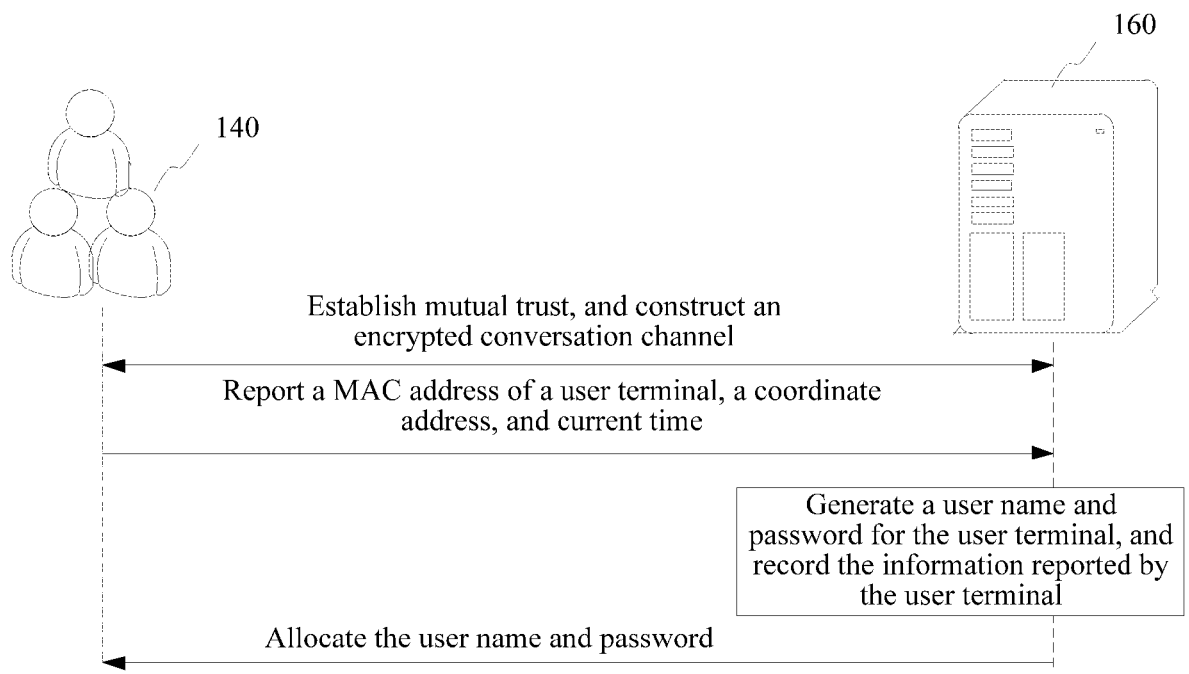
FIG. 4B is a schematic diagram of a process in which an authentication server allocates a user name and password to a user terminal according to an embodiment of the present disclosure.

In an example, a process in which an authentication server allocates a user name and password to a user terminal is shown in FIG. 4B. In FIG. 4B, a user terminal 140 and an authentication server 160 first establish mutual trust, and construct an encrypted conversation channel. That is, an independent channel is established between the user terminal 140 and the authentication server 160. The user terminal 140 reports a MAC address of the user terminal 140, a coordinate address, and current time to the authentication server 160 through the encrypted conversation channel, and the authentication server 160 generates a user name and password according to the reported information. The authentication server 160 allocates the user name and password to the user terminal 140 through the encrypted conversation channel. That is, a process of allocating the user name and password is completed bypassing a communication channel of a wireless access point.

Optionally, when sending an information registration request to the authentication server, the user terminal may send the information registration request to the authentication server by using a communications client or a browser client, for example, an instant messaging application client, or a microblog client.

Figure 4C:
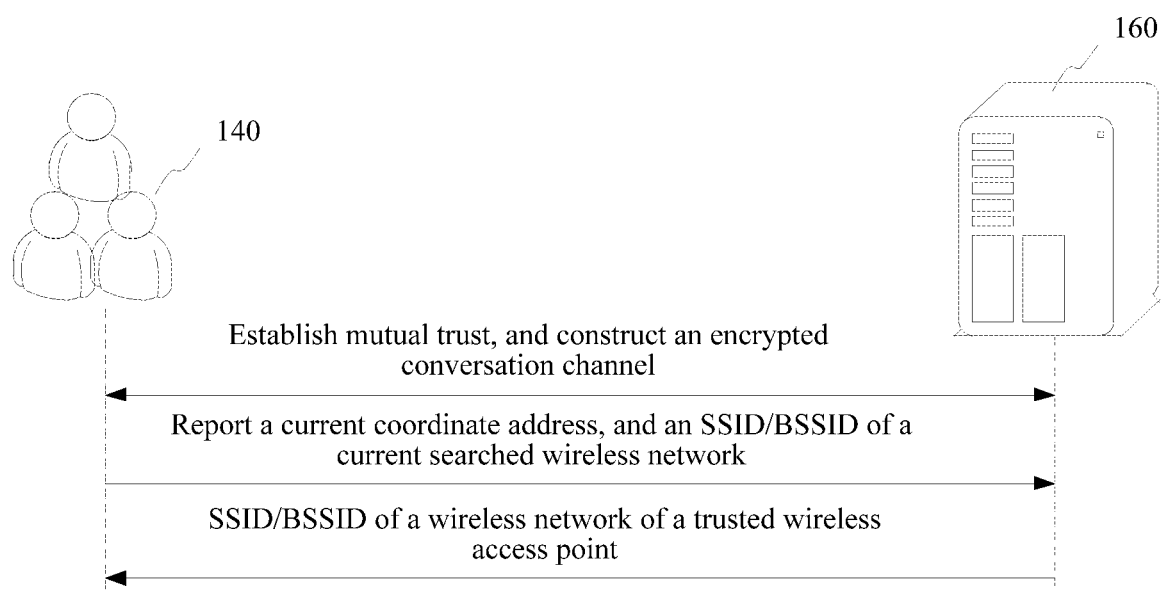
FIG. 4C is a schematic diagram of requesting, by a user terminal, from an authentication server for a trusted wireless access point according to an embodiment of the present disclosure.
Figure 4D:
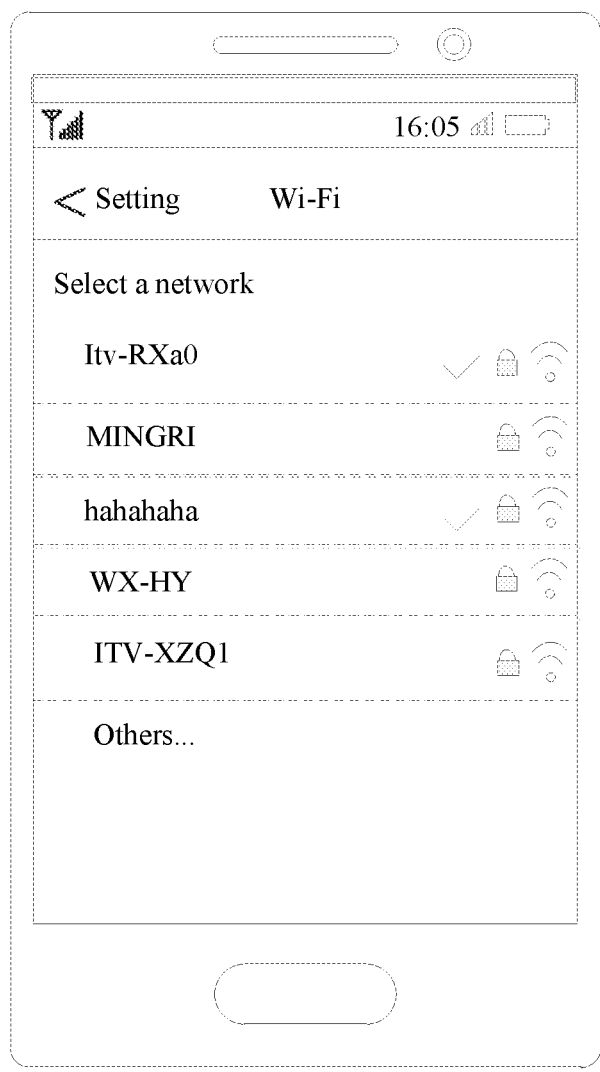
FIG. 4D is an interface diagram of viewing, by a user terminal, a trusted wireless access point according to an embodiment of the present disclosure.

First, the authentication server may alternatively recommend a trusted wireless access point to the user terminal, as shown in FIG. 4C. In FIG. 4C, a user terminal 140 and an authentication server 160 establish mutual trust. After an encrypted conversation channel is established, the user terminal 140 reports a current coordinate address, and an SSID/BSSID of a current searched wireless network to the authentication server 160. The authentication server 160 detects a wireless network of the trusted wireless access point from the SSID/BSSID of the current searched network according to the received current coordinate address and the SSID/BSSID of the current searched wireless network, and returns an SSID/BSSID of the wireless network of the trusted wireless access point to the user terminal 140. The user terminal 140 marks the SSID/BSSID of the wireless network of the trusted wireless access point to recommend to a user for connection. An interface diagram of marking the SSID/BSSID of the wireless network of the trusted wireless access point by the user terminal 140 is shown in FIG. 4D. In FIG. 4D, the user terminal 140 marks the wireless network of the trusted wireless access point by using"√".

Second, after the identity authentication performed by the authentication server on the user terminal shown in an embodiment of FIG. 3A, the wireless access point stores the identifier of the wireless access point and the session key corresponding to the identifier of the wireless access point; and the authentication server stores the identifier of the wireless access point and the session key corresponding to the identifier of the wireless access point. After the process in which the authentication server allocates the user name and password to the user terminal shown in an embodiment of FIG. 4A, the user terminal stores the user name and password, and the authentication server stores the MAC address of the user terminal, the user name and password. Based on the above, after the embodiments of FIG. 3A and FIG. 4A, the wireless access point stores the identifier of the wireless access point and the session key corresponding to the identifier of the wireless access point; the user terminal stores the user name and password; the authentication server stores the identifier of the wireless access point and the session key corresponding to the identifier of the wireless access point, the MAC address of the user terminal, the user name and password.

Third, it should be noted that the steps related to the side of the authentication server in this embodiment may be independently implemented as the process in which the authentication server allocates the user name and password from the side of the authentication server.

Figure 5A:
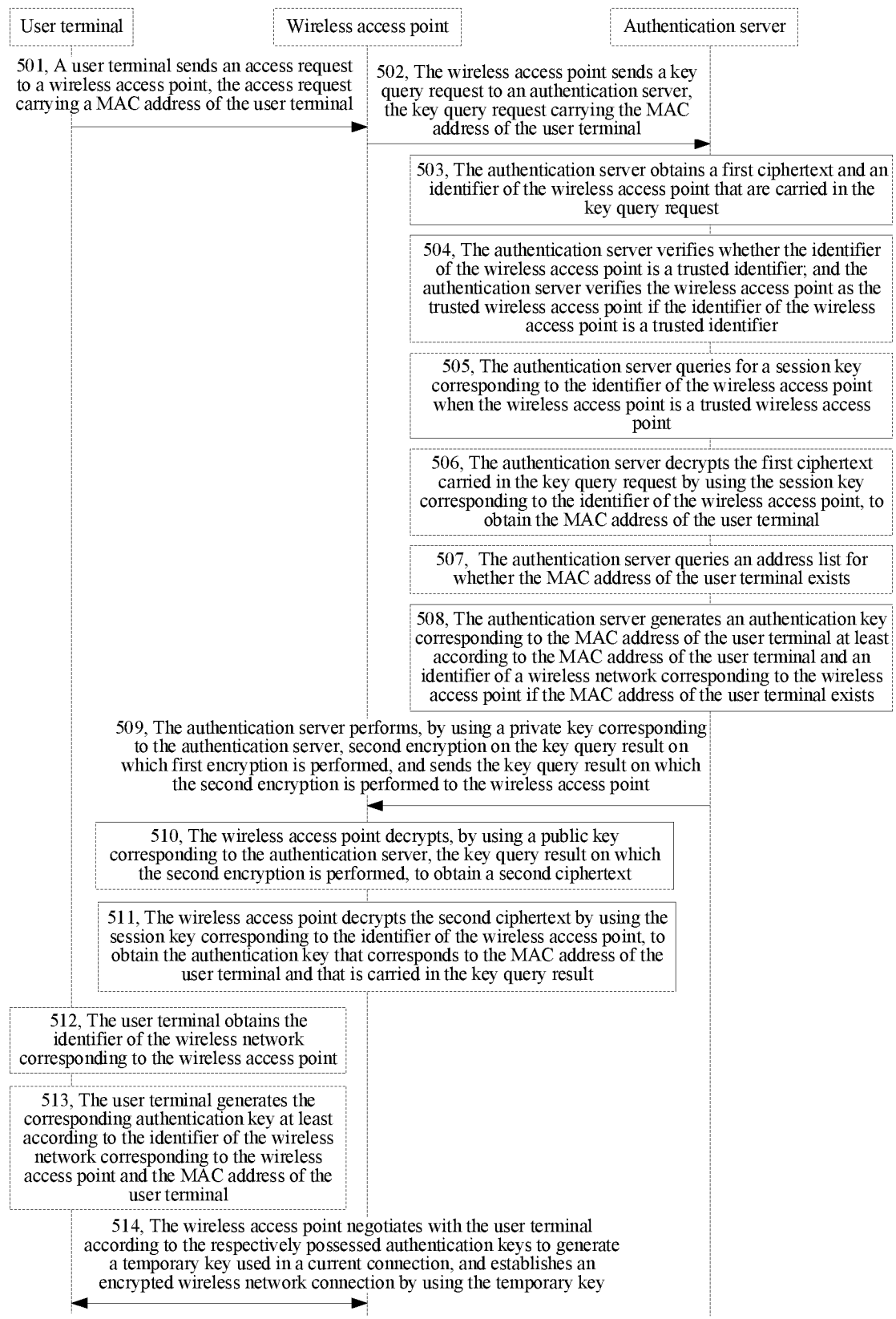
FIG. 5A is a flowchart of a wireless network connection method according to an embodiment of the present disclosure.

Referring to FIG. 5A, FIG. 5A is a flowchart of a wireless network connection method according to an embodiment of the present disclosure. This embodiment is described by using an example in which the wireless network connection method is applied to the wireless network access system shown in FIG. 1. The method includes the following steps:

Step 501. A user terminal sends an access request to a wireless access point, the access request carrying a MAC address of the user terminal.

The user terminal stores a user name and password allocated by an authentication server. When the user terminal selects a to-be-accessed wireless access point, the user terminal sends the access request to the wireless access point, the access request carrying the MAC address of the user terminal. The user terminal sends the access request to the wireless access point in the following manners.

Optionally, the user terminal scans, by using a barcode scanning function in an application program, a two-dimensional code carrying hardware information of the wireless access point and provided by a merchant, to send the access request to the wireless access point. Optionally, the user terminal sends the access request to the wireless access point according to an official account carrying the hardware information of the wireless access point and provided by a merchant. Optionally, the user terminal sends the access request to the wireless access point by using an independent wireless network client, and the independent wireless network client is provided by an authentication server and carries the hardware information of the wireless access point. For example, the user terminal scans, by using a function of "scan QR code" on a social application, a two-dimensional barcode carrying the hardware information of the wireless access point and provided by a merchant, and sends the access request to the wireless access point by using the social application. For another example, the user terminal directly scans, by using a function of "scan QR code" on a browser, a two-dimensional barcode carrying the hardware information of the wireless access point and provided by a merchant, and directly sends the access request to the wireless access point by using the browser. For another example, the user terminal follows, by using a function of "follow" on a social application, an official account provided by a merchant, and sends the access request to the wireless access point by using the official account. For still another example, the user terminal installs an independent wireless network client carrying the hardware information of the wireless access point and provided by an authentication server, and sends the access request to the wireless access point by using the independent wireless network client. Correspondingly, the wireless access point receives the access request sent by the user terminal.

Step S502: The wireless access point sends a key query request to an authentication server, the key query request carrying the MAC address of the user terminal.

Optionally, the key query request further carries an identifier of the wireless access point. Optionally, the key query request further carries time of the access request, a request key instruction, and the like, the request key instruction being used to request to obtain an authentication key corresponding to the MAC address of the user terminal. After receiving the access request sent by the user terminal, the wireless access point sends the identifier of the wireless access point and the MAC address carried in the access request to the authentication server. Optionally, the key query request carries a first ciphertext and the identifier of the wireless access point, the key query request is a request of performing encryption, by the wireless access point by using a public key corresponding to the authentication server, the first ciphertext is a ciphertext through which the wireless access point encrypts the MAC address, the time of the access request, and the request key instruction by using a session key corresponding to the identifier of the wireless access point. Correspondingly, the authentication server receives the key query request sent by the wireless access point.

Step S503: The authentication server obtains a first ciphertext and an identifier of the wireless access point that are carried in the key query request.

After receiving the key query request sent by the wireless access point, the authentication server obtains the first ciphertext and the identifier of the wireless access point that are carried in the key query request. The first ciphertext includes the MAC address of the user terminal.

Step S504: The authentication server verifies whether the identifier of the wireless access point is a trusted identifier; and the authentication server verifies the wireless access point as the trusted wireless access point if the identifier of the wireless access point is a trusted identifier.

The trusted identifier is an identifier of a wireless access point on which identity authentication performed by the authentication server succeeds. After obtaining the identifier of the wireless access point, the authentication server verifies whether the identifier of the wireless access point is a trusted identifier; and the authentication server verifies the wireless access point as the trusted wireless access point if the identifier of the wireless access point is a trusted identifier. Optionally, the authentication server stores data identifying a set of trusted identifiers, and the set of trusted identifiers is a list of wireless access points on which the identity authentication performed by the authentication server succeeds.

For example, using the exemplary set of trusted identifiers shown in Table 3 as an example, assuming that the identifier of the wireless access point obtained by the authentication server is an ID 2, the ID 2 obtained by the authentication server is matched against an identifier in the set of trusted identifiers shown in Table 3, and then it is found that the ID 2 belongs to the set of trusted identifiers. In this case, the authentication server determines that the wireless access point is the trusted wireless access point. Optionally, when the authentication server verifies that the wireless access point is not a trusted wireless access point, the authentication server does not perform any subsequent step.

Step S505: The authentication server queries for a session key corresponding to the identifier of the wireless access point when the wireless access point is a trusted wireless access point.

After determining that the wireless access point is the trusted wireless access point, the authentication server queries for the session key corresponding to the identifier of the wireless access point according to the identifier of the wireless access point.

The session key corresponding to the identifier of the wireless access point is stored in the authentication server when the wireless access point is registered successfully; or is stored in the authentication server when identity authentication performed on the wireless access point succeeds.

Step S506: The authentication server decrypts the first ciphertext carried in the key query request by using the session key corresponding to the identifier of the wireless access point, to obtain the MAC address of the user terminal.

After obtaining the session key corresponding to the identifier of the wireless access point, the authentication server decrypts the obtained first ciphertext by using the obtained session key, and the decrypted first ciphertext carries the MAC address of the user terminal. The first ciphertext is a ciphertext through which the wireless access point encrypts the MAC address of the user terminal by using the session key corresponding to the identifier of the wireless access point.

Step S507: The authentication server queries an address list to determine whether the MAC address of the user terminal exists.

After decrypting the first ciphertext to obtain the MAC address of the user terminal carried in the first ciphertext, the authentication server queries a pre-stored address list to determine whether the MAC address of the user terminal carried in the first ciphertext exists. The address list is a list of MAC addresses of the user terminal stored in the authentication server when the user terminal is registered successfully. For example, using the exemplary correspondence shown in Table 4 as an example, assuming that the MAC address carried in the key query request obtained by the authentication server is "MAC 1", then the authentication server queries the pre-stored correspondence to determine whether the "MAC 1" exists, and as shown in Table 4, the "MAC 1" exists; and when the MAC address carried in the key query request obtained by the authentication server is "MAC 2", as shown in Table 4, the "MAC 2" does not exist.

Step S508: The authentication server generates an authentication key corresponding to the MAC address of the user terminal at least according to the MAC address of the user terminal and an identifier of a wireless network corresponding to the wireless access point if the MAC address of the user terminal exists.

Optionally, if the MAC address of the user terminal exists in the address list of the authentication server, the authentication server generates the authentication key corresponding to the MAC address of the user terminal at least according to the MAC address of the user terminal, an SSID of the wireless network corresponding to the wireless access point, and a BSSID of the wireless network corresponding to the wireless access point. Optionally, the authentication server calculates, by using a hash algorithm, the authentication key corresponding to the MAC address of the user terminal according to the MAC address of the user terminal, the SSID of the wireless network corresponding to the wireless access point, the BSSID of the wireless network corresponding to the wireless access point, a password corresponding to the MAC address of the user terminal, and the time of the access request. In this embodiment, an algorithm used by the authentication server to generate the authentication key is not specifically limited.

Step 509: The authentication server performs, by using a private key corresponding to the authentication server, second encryption on the key query result on which first encryption is performed, and sends the key query result on which the second encryption is performed to the wireless access point.

The key query result carries the authentication key corresponding to the MAC address of the user terminal. Optionally, the authentication server performs the first encryption on the key query result by using the session key corresponding to the identifier of the wireless access point; then performs, by using the private key corresponding to the authentication server, the second encryption on the key query result on which the first encryption is performed; and sends the key query result on which the second encryption is performed to the wireless access point.

The session key corresponding to the identifier of the wireless access point is stored in the authentication server when the wireless access point is registered successfully; or is stored in the authentication server when identity authentication performed on the wireless access point succeeds.

Optionally, this embodiment is described merely by using an example in which the first encryption is first performed on the key query result by using the session key corresponding to the identifier of the wireless access point, and then the second encryption is performed, by using the private key corresponding to the authentication server, on the key query result on which the first encryption is performed. In this embodiment, an encryption sequence for the key query result is not specifically limited. The private key corresponding to the authentication server may be first used to perform the first encryption on the key query result, and then the session key corresponding to the identifier of the wireless access point is used to perform the second encryption on the key query result on which the first encryption is performed. In this embodiment, a manner of encrypting the key query result by the authentication server is not specifically limited. Double encryption further improves the security of transmitting data between the user terminal and the wireless access point. Correspondingly, the wireless access point receives the key query result sent by the authentication server.

Step 510: The wireless access point decrypts, by using a public key corresponding to the authentication server, the key query result on which the second encryption is performed, to obtain a second ciphertext.

After receiving the key query result sent by the authentication server on which the second encryption is performed, the wireless access point decrypts, by using the public key corresponding to the authentication server, the key query result on which the second encryption is performed, to obtain the second ciphertext. The second ciphertext is a ciphertext through which the authentication server encrypts the key query result by using the session key corresponding to the identifier of the wireless access point.

Step S511: The wireless access point decrypts the second ciphertext by using the session key corresponding to the identifier of the wireless access point, to obtain the authentication key that corresponds to the MAC address of the user terminal and that is carried in the key query result.

After decrypting, by using the public key corresponding to the authentication server, the key query result on which the second encryption is performed, to obtain the second ciphertext, the wireless access point decrypts the second ciphertext by using the session key corresponding to the identifier of the wireless access point, to obtain the authentication key corresponding to the MAC address of the user terminal. Optionally, if the authentication server only uses the session key corresponding to the identifier of the wireless access point to encrypt the key query result, the wireless access point only needs to use the session key corresponding to the identifier of the wireless access point to decrypt the encrypted key query result, and obtains the authentication key corresponding to the MAC address of the user terminal.

Step S512: The user terminal obtains the identifier of the wireless network corresponding to the wireless access point.

Optionally, when sending the access request to the wireless access point, the user terminal obtains the identifier of the wireless network corresponding to the wireless access point.

Step S513: The user terminal generates the corresponding authentication key at least according to the identifier of the wireless network corresponding to the wireless access point and the MAC address of the user terminal.

Optionally, the user terminal generates the corresponding authentication key corresponding to the MAC address of the user terminal according to the MAC address of the user terminal, the SSID of the wireless network corresponding to the wireless access point, and the BSSID of the wireless network corresponding to the wireless access point. Optionally, the user terminal calculates, by using a hash algorithm, the authentication key corresponding to the MAC address of the user terminal according to the MAC address of the user terminal, the SSID of the wireless network corresponding to the wireless access point, the BSSID of the wireless network corresponding to the wireless access point, the password corresponding to the MAC address of the user terminal, and the time of the access request. In this embodiment, the algorithm used by the user terminal to generate the authentication key is the same as the algorithm used by the authentication server to generate the authentication key.

Step 514: The wireless access point negotiates with the user terminal according to the respectively possessed authentication keys to generate a temporary key used in a current connection, and establishes an encrypted wireless network connection by using the temporary key.

Optionally, the wireless access point and the user terminal use the respectively possessed authentication keys as pairwise master keys (PMKs), to complete a Wi-Fi Protected Access II (WPA2) encryption protocol. The authentication keys are used as the PMKs, and a pairwise temporary key (PTK) used in the current connection is generated through negotiation. At last, the encrypted wireless network connection is established by using the PTK.

Figure 5B:
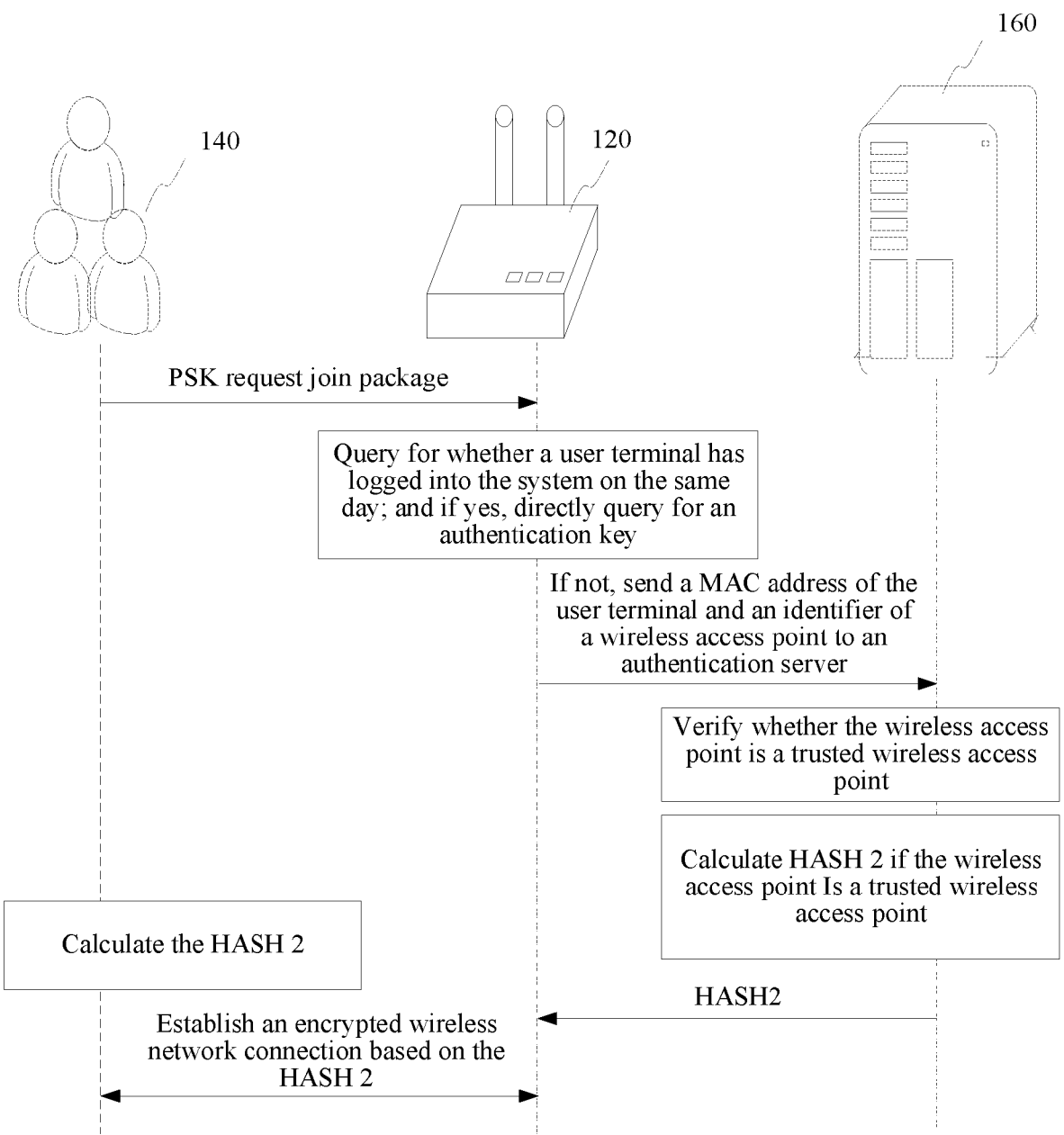
FIG. 5B is a schematic diagram of a process in which a user terminal accesses a wireless access point according to an embodiment of the present disclosure.

In an example, a process in which the user terminal accesses the wireless access point is shown in FIG. 5B. In FIG. 5B, a user terminal 140 sends a pre-shared key (PSK) request join package to a wireless access point 120, the PSK request join package carrying a MAC address of the user terminal. The wireless access point 120 queries to determine whether the user terminal 140 has logged into the system on the same day; if yes, the wireless access point 120 locally queries for an authentication key logged into at last time; and if no, the wireless access point 120 sends the MAC address of the user terminal 140 and an identifier of the wireless access point 120 to an authentication server 160. The authentication server 160 verifies whether the wireless access point 120 is a trusted wireless access point, after determining that the wireless access point is a trusted wireless access point, calculates, by using a hash algorithm, HASH 2 according to the MAC address of the user terminal 140, an SSID and a BSSID of a wireless network corresponding to the wireless access point 120, a password corresponding to the MAC address of the user terminal, and current time of the PSK request join package. The HASH 2 is an authentication key corresponding to the MAC address of the user terminal 140, and the user terminal 140 generates the same HASH 2 according to the algorithm same as the authentication server. The user terminal 140 and the wireless access point 120 use the possessed HASH 2 as a PMK, to negotiate to establish an encrypted wireless network connection.

Optionally, when the user terminal is a terminal that can provide a network, when the user terminal requests from the authentication server for a list of trusted wireless access points, the authentication server may send back a new password to the user terminal, and force to replace the password in the user name and password that are stored before with the new password fed back at this time.

Based on the above, in the wireless network connection method in this embodiment, only the trusted wireless access point that can be verified by the authentication server can obtain the authentication key corresponding to the MAC address of the user terminal, therefore, the user terminal negotiates with the wireless access point according to the obtained authentication key to establish the encrypted wireless network connection, thereby improving security of data transmitted by the user terminal and data within the user terminal. In addition, the authentication server and the wireless access point transmit data to each other through an encrypted channel, thereby improving data security during transmission. In addition, the authentication server sends back the new password to the user terminal, and forces to replace the password in the user name and password that are stored before with the new password fed back at this time, therefore, when the MAC addresses of the user terminal are the same, the generated authentication keys are different, thereby resolving a problem of repeated MAC addresses.

First, that a manner in which the wireless access point sends the key query request to the authentication server may include the following three manners.

In a first possible implementation, the wireless access point sends the key query request to the authentication server, the key query request carrying the MAC address, the time of the access request, the request key instruction, and the identifier of the wireless access point. That is, the wireless access point directly sends plaintext of the MAC address, the time of the access request, the request key instruction, and the identifier of the wireless access point to the authentication server. In a second possible implementation, the wireless access point sends the key query request to the authentication server, the key query request carrying the MAC address, the time of the access request, the request key instruction, and the identifier of the wireless access point, and the key query request being a request of performing encryption, by the wireless access point by using the public key corresponding to the authentication server. In a third possible implementation, the wireless access point sends the key query request to the authentication server, the key query request carrying the first ciphertext and the identifier of the wireless access point, the key query request being a request of performing encryption, by the wireless access point by using the public key corresponding to the authentication server, and the first ciphertext is a ciphertext through which the wireless access point encrypts the MAC address, a date of the access request, and the request key instruction by using the session key corresponding to the identifier of the wireless access point. The third possible implementation is described as an example in an embodiment of FIG. 5A.

Second, among different manners in which the wireless access point sends the key query request to the authentication server, the manners in which the authentication server receives the key query request of the wireless access point are different.

For the first possible implementation, after receiving the key query request, the authentication server directly obtains the MAC address, the time of the access request, the request key instruction, and the identifier of the wireless access point that are carried in the key query request. For the second possible implementation, after receiving the key query request, the authentication server decrypts the key query request by using a private key corresponding to the authentication server, to obtain the MAC address, the time of the access request, the request key instruction, and the identifier of the wireless access point that are carried in the key query request, the key query request being a request of encrypting, by the wireless access point, the first ciphertext and the identifier of the wireless access point by using a public key corresponding to the authentication server. The third possible implementation is shown in step S504 to step S506 in the embodiment of FIG. 5A.

Third, a manner in which the authentication server sends the key query result to the wireless access point includes the following three manners.

In a first possible implementation, the authentication server sends the key query result to the wireless access point through the encrypted channel, the key query result carrying an authentication key corresponding to the MAC address of the user terminal. In a second possible implementation, the authentication server encrypts the key query result by using the private key corresponding to the authentication server, and sends the encrypted key query result to the wireless access point. In a third possible implementation, the authentication server first performs the first encryption on the key query result by using the session key corresponding to the identifier of the wireless access point, then performs, by using the private key corresponding to the authentication server, the second encryption on the key query result on which the first encryption is performed; and sends the key query result on which the second encryption is performed to the wireless access point. The third possible implementation is described as an example in the embodiment of FIG. 5A.

Fourth, after receiving the access request sent by the user terminal, the wireless access point may first queries to determine whether the user terminal has logged into in a pre-determined time period; if the user terminal has logged into, the wireless access point directly locally queries for the authentication key used when the user terminal logged into at last time; and if the user terminal has not logged into, the wireless access point obtains the MAC address of the user terminal, and sends the key query request to the authentication server. Optionally, when the user terminal repeatedly logs into one wireless access point in one day, the wireless access point only needs to sends the key query request to the authentication server when the user terminal first sends the access request, and when the user terminal logs into again, the wireless access point directly locally obtains the authentication key used when the user terminal logged into at last time.

Fifth, in this embodiment of the present disclosure, when the wireless access point and the authentication server transmit data to each other through the encrypted channel, the transmitted data may further carry information such as a random number separately generated by the wireless access point and the authentication server, or a time stamp for sending the data. For example, when the wireless access point sends data to the authentication server, the data further carries information such as a random number generated by the wireless access point, or a time stamp for sending the data. In this embodiment of the present disclosure, in the process in which the wireless access point and the authentication server transmit data to each other, in addition to the information carried in the data in the foregoing embodiment, the data may further carry other information, which is not specifically limited. Similarly, when the user terminal and the authentication server transmit data to each other through the independent channel, the transmitted data may further carry information such as a random number separately generated by the user terminal and the authentication server, or a time stamp for sending the data. Details are not described herein again. All variant embodiments for information that may be further carried in the data are equivalent replacement embodiments of this embodiment of the present disclosure, and fall within the protection scope of the present disclosure.

Sixth, the steps related to the side of the authentication server in this embodiment may be independently implemented as the wireless network connection method from the side of the authentication server, and the steps related to the side of the wireless access point may be independently implemented as the wireless network connection method from the side of the wireless access point.

Figure 6A:
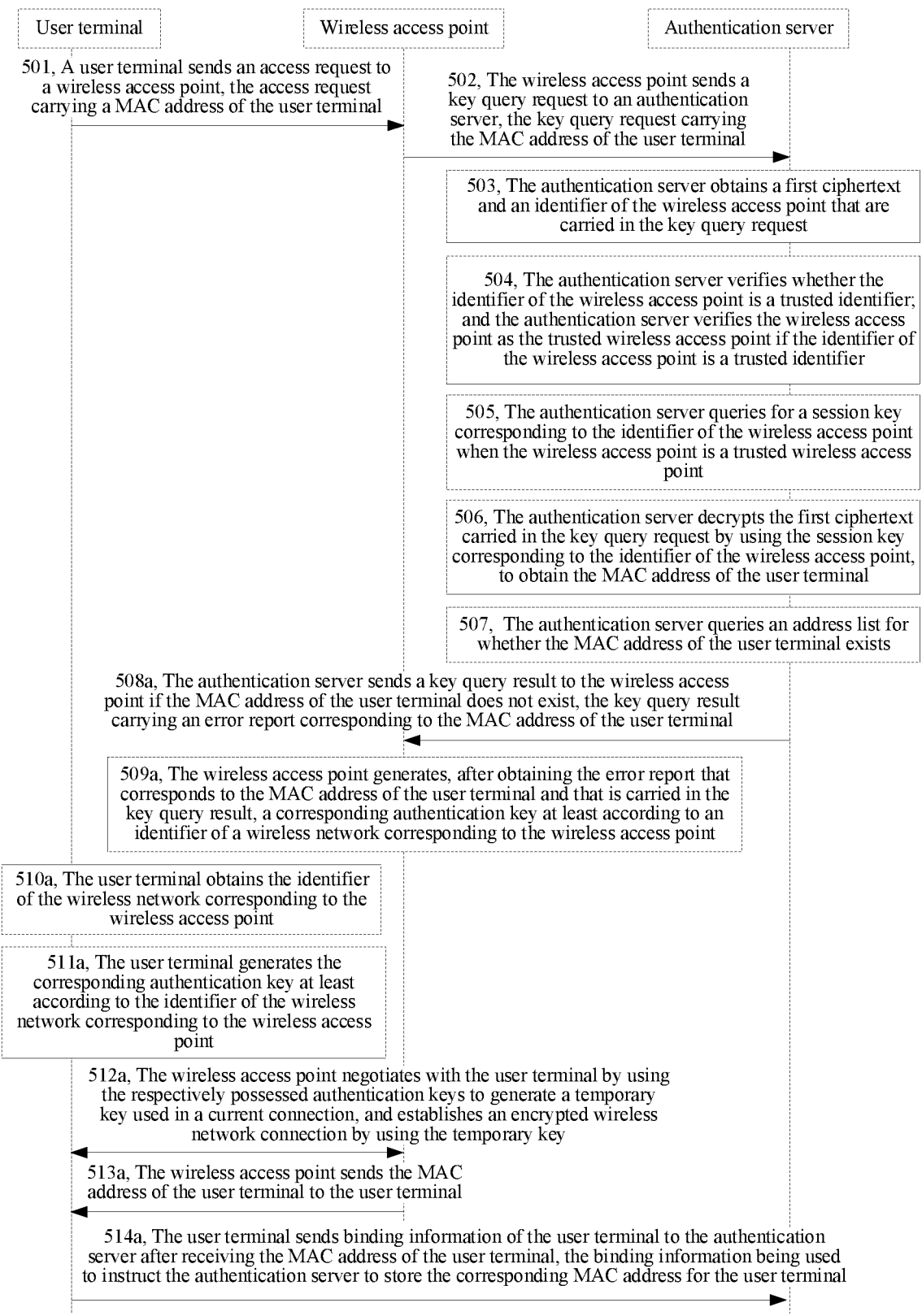
FIG. 6A is a flowchart of a wireless network connection method according to another embodiment of the present disclosure.

Based on the embodiment shown in FIG. 5A, in step S507, when the user terminal sends the information registration request to the authentication server, the information registration request does not carry the MAC address of the user terminal, and the authentication server does not store the MAC address of the user terminal after allocating the user name and password to the user terminal. Therefore, a query result of querying, by the authentication server, the address list to determine whether the MAC address of the user terminal exists further includes a situation in which the MAC address of the user terminal does not exist. Step S508 to step S514 in the embodiment shown in FIG. 5A may be replaced with step S508a to step S514a. The specific steps are shown in FIG. 6A.

Step S508a: The authentication server sends a key query result to the wireless access point if the MAC address of the user terminal does not exist, the key query result carrying an error report corresponding to the MAC address of the user terminal.

Optionally, if the MAC address of the user terminal does not exist in the address list in the authentication server, the authentication server sends the key query result carrying the error report to the wireless access point. The address list is a list of MAC addresses of the user terminal stored in the authentication server when the user terminal is registered successfully; and the error report is code generated by the authentication server according to the MAC address of the user terminal when the MAC address of the user terminal does not exist. Correspondingly, the wireless access point receives the key query result sent by the authentication server. Optionally, the authentication server may send the key query result carrying the error report to the wireless access point in the three manners provided in the third note in the embodiment shown in FIG. 5A. For the detailed manners, refer to the third note in the embodiment shown in FIG. 5A. Details are not described again in this embodiment.

Step S509a: The wireless access point generates, after obtaining the error report that corresponds to the MAC address of the user terminal and that is carried in the key query result, a corresponding authentication key at least according to an identifier of a wireless network corresponding to the wireless access point.

Optionally, the wireless access point generates the corresponding authentication key according to the SSID of the wireless network corresponding to the wireless access point and the BSSID of the wireless network corresponding to the wireless access point. Optionally, the wireless access point calculates, by using the hash algorithm, the corresponding authentication key according to the SSID of the wireless network corresponding to the wireless access point, the BSSID of the wireless network corresponding to the wireless access point, and the time of the access request. In this embodiment, an algorithm used by the wireless access point to generate the authentication key is not specifically limited.

Step S510a: The user terminal obtains the identifier of the wireless network corresponding to the wireless access point.

Optionally, when sending the access request to the wireless access point, the user terminal obtains the identifier of the wireless network corresponding to the wireless access point. The identifier of the wireless network corresponding to the wireless access point includes the SSID of the wireless network and the BSSID of the wireless network.

Step S511a: The user terminal generates the corresponding authentication key at least according to the identifier of the wireless network corresponding to the wireless access point.

Optionally, the user terminal generates the corresponding authentication key according to the SSID of the wireless network corresponding to the wireless access point and the BSSID of the wireless network corresponding to the wireless access point. Optionally, the user terminal calculates, by using the hash algorithm, the corresponding authentication key according to the SSID of the wireless network corresponding to the wireless access point, the BSSID of the wireless network corresponding to the wireless access point, and the time of the access request. In this embodiment, the algorithm used by the user terminal to generate the authentication key is the same as the algorithm used by the wireless access point to generate the authentication key.

Step S512a: The wireless access point negotiates with the user terminal by using the respectively possessed authentication keys to generate a temporary key used in a current connection, and establishes an encrypted wireless network connection by using the temporary key.

Optionally, the wireless access point and the user terminal use the respectively possessed authentication keys as PMKs, to complete WPA2. The authentication keys are used as the PMKs, and a PTK used in the current connection is generated through negotiation. At last, the encrypted wireless network connection is established by using the PTK.

Step S513a: The wireless access point sends the MAC address of the user terminal to the user terminal.

After negotiating, by using the authentication keys, with the user terminal to establish the encrypted wireless network connection, the wireless access point sends the MAC address of the user terminal to the user terminal.

Step S514a: The user terminal sends binding information of the user terminal to the authentication server after receiving the MAC address of the user terminal, the binding information being used to instruct the authentication server to store the corresponding MAC address for the user terminal.

Optionally, the binding information includes the MAC address of the user terminal and the user name of the user terminal, or the MAC address of the user terminal and the password of the user terminal, or the MAC address of the user terminal, the user name of the user terminal, and the password of the user terminal. The user name of the user terminal and the password of the user terminal are allocated by the authentication server when the user terminal is registered.

Figure 6B:
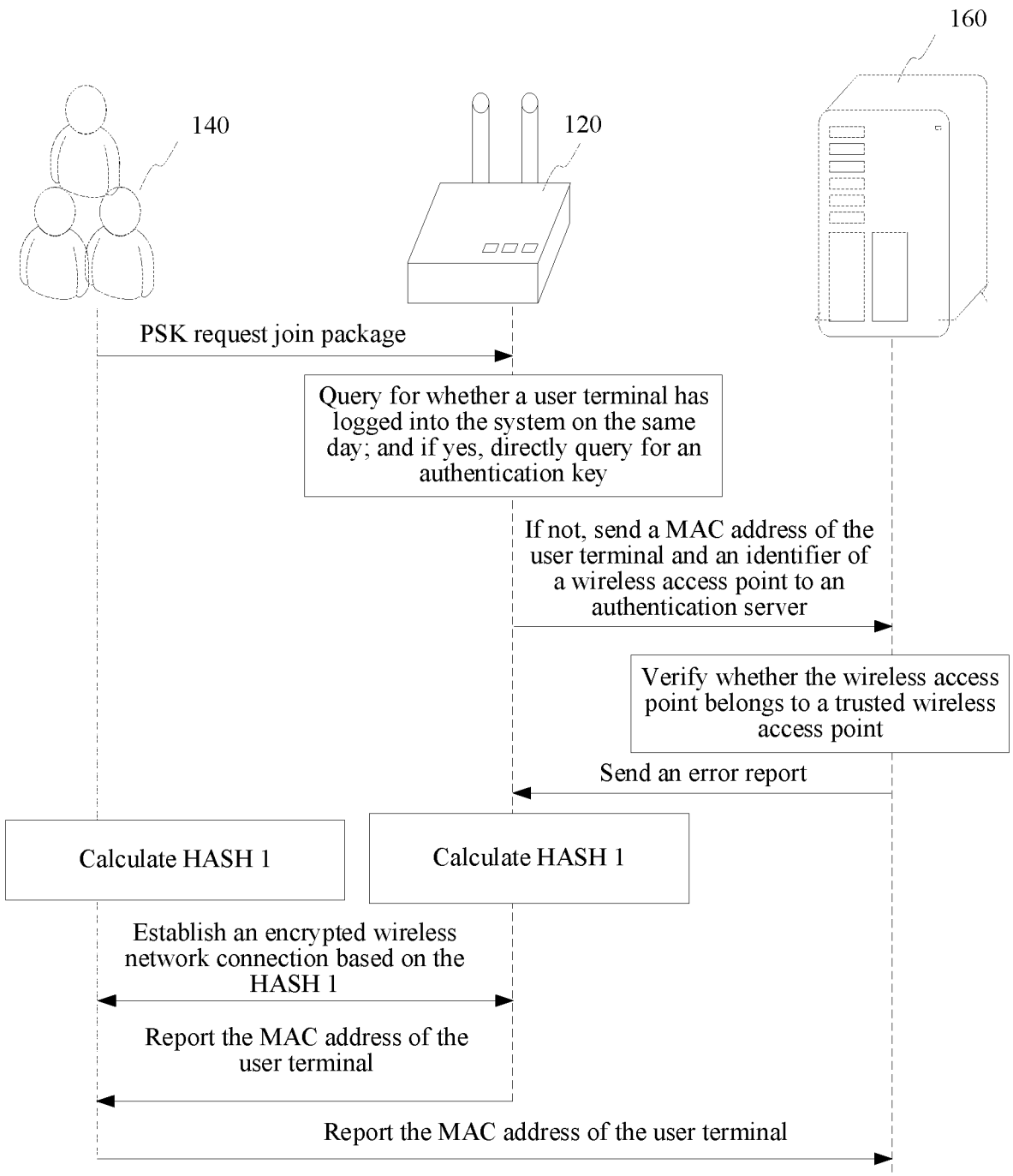
FIG. 6B is a schematic diagram of a process in which a user terminal accesses a wireless access point according to another embodiment of the present disclosure.

In an example, a process in which the user terminal accesses the wireless access point is shown in FIG. 6B. A user terminal 140 sends a PSK request join package to a wireless access point 120, the PSK request join package carrying a MAC address of the user terminal. The wireless access point 120 queries to determine whether the user terminal 140 has logged into the system on the same day; if yes, the wireless access point 120 locally queries for an authentication key logged into at last time; and if no, the wireless access point 120 sends the MAC address of the user terminal 140 and an identifier of the wireless access point 120 to an authentication server 160. The authentication server 160 verifies whether the wireless access point 120 is a trusted wireless access point, after determining that the wireless access point is a trusted wireless access point, the authentication server 160 generates an error report according to the MAC address of the user terminal 140, and sends the error report to wireless access point 120. The wireless access point 120 calculates, by using a hash algorithm, HASH 1 according to an SSID of a wireless network corresponding to the wireless access point, a BSSID of the wireless network corresponding to the wireless access point 120, and current time of the PSK request join package. The user terminal 140 calculates, by using the hash algorithm, HASH 1 according to the SSID of a wireless network corresponding to the wireless access point, the BSSID of the wireless network corresponding to the wireless access point 120, and the current time of the PSK request join package. The HASH 1 is an authentication key corresponding to the MAC address of the user terminal 140, and the user terminal 140 and the wireless access point 120 use the possessed same HASH 1 as a PMK, to negotiate to establish an encrypted wireless network connection. After the wireless access point 120 and the user terminal 140 establish the encrypted wireless network connection, the wireless access point 120 sends the MAC address of the user terminal 140 to the user terminal 140; and the user terminal 140 sends the corresponding MAC address to the authentication server 160 for binding, and then step S401 and step S402 in the embodiment of FIG. 4A are performed.

Based on the above, in the wireless network connection method in this embodiment, only the trusted wireless access point that can be verified by the authentication server can obtain the authentication key corresponding to the MAC address of the user terminal, therefore, the user terminal negotiates with the wireless access point according to the obtained authentication key to establish the encrypted wireless network connection, thereby improving security of data transmitted by the user terminal and data within the user terminal. When the authentication server does not pre-store the MAC address of the user terminal, the user terminal and the wireless access point respectively generate corresponding authentication keys at least according to the identifier of the wireless network corresponding to the wireless access point, and establish the encrypted wireless network connection according to the possessed authentication keys, thereby improving security of the process of the wireless network connection, and security of exchanging data after the wireless network is connected.

In some embodiments, the steps related to the side of the authentication server in this embodiment may be independently implemented as the wireless network connection method from the side of the authentication server, and the steps related to the side of the wireless access point may be independently implemented as the wireless network connection method from the side of the wireless access point. It also needs to be noted that the embodiment of FIG. 3A, the embodiment of FIG. 4A, the embodiment of FIG. 5A, and the embodiment of FIG. 6A of the embodiments of the present disclosure may be combined to implement different wireless network access methods. A combination manner of the embodiments is not limited in the embodiments of the present disclosure.

In a specific embodiment, it is assumed that a hacker sets a fake wireless access point, and the fake wireless access point has completely the same hardware information as an actual wireless access point does. First, after obtaining the fake wireless access point, the user terminal sends an access request to the fake wireless access point, the access request carrying the MAC address corresponding to the user terminal. Second, the fake wireless access point sends a key query request to an authentication server, the key query request carrying the MAC address corresponding to the user terminal. The fake wireless access point obtains a public key corresponding to the authentication server, uses the public key corresponding to the authentication server to encrypt the key query request, and sends the encrypted key query request to the authentication server. Third, the authentication server decrypts the key query request by using a private key corresponding to the authentication server, to obtain an identifier of the fake wireless access point and the MAC address of the user terminal. Fourth, the authentication server verifies whether the identifier of the fake wireless access point is a trusted identifier.

Although the fake wireless access point has completely the same hardware information as the actual wireless access point does, the identifier of the fake wireless access point is different from the identifier of the actual wireless access point. Therefore, the authentication server determines that the fake wireless access point is an untrusted wireless access point when verifying whether the identifier of the fake wireless access point is a trusted identifier. The authentication server does not perform any subsequent step after determining that the wireless access point is a fake wireless access point.

Based on the above, if a hacker sets a fake wireless access point, the fake wireless access point has completely the same hardware information as the actual wireless access point does. In the wireless network access method provided in the embodiment shown in FIG. 5A, the fake wireless access point cannot establish an encrypted wireless network connection to the user terminal. In step 504, the identifier of the fake wireless access point is not a trusted identifier stored in the authentication server. Therefore, the wireless radio access point is determined by the authentication server as an untrusted wireless access point. Therefore, the wireless network access method provided in the embodiment in FIG. 5A improves security of data transmitted by the user terminal and data within the user terminal.

Figure 7:
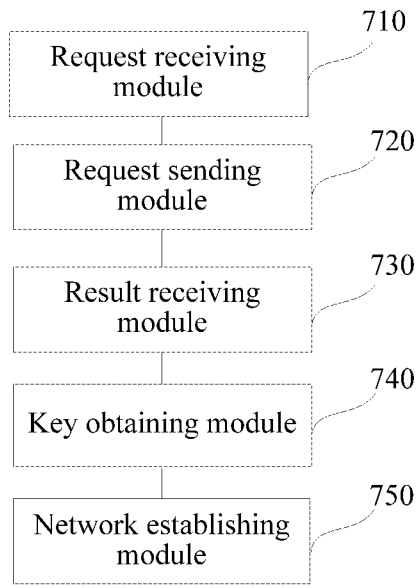
FIG. 7 is a structural block diagram of a wireless network connection apparatus according to an embodiment of the present disclosure.

Referring to FIG. 7, FIG. 7 is a structural block diagram of a wireless network connection apparatus according to an embodiment of the present disclosure. The wireless network connection apparatus may be implemented to be all or a part of the radio access point in FIG. 1 by using software, hardware, or a combination thereof. The wireless network connection apparatus includes: a request receiving module 710, configured to receive an access request sent by a user terminal, the access request carrying a MAC address of the user terminal; a request sending module 720, configured to send a key query request to an authentication server, the key query request carrying the MAC address of the user terminal; a result receiving module 730, configured to receive a key query result that corresponds to the MAC address of the user terminal and that is sent by the authentication server, the key query result being sent by the authentication server when verifying that a wireless access point is a trusted wireless access point after receiving the key query request; a key obtaining module 740, configured to obtain an authentication key corresponding to the MAC address of the user terminal according to the key query result; and a network establishing module 750, configured to negotiate with the user terminal according to respectively possessed authentication keys to establish an encrypted wireless network connection.

Based on the above, the wireless network connection apparatus provided in this embodiment receives an access request sent by a user terminal; sends a key query request to an authentication server; receives a key query result that corresponds to a MAC address of the user terminal and that is sent by the authentication server; obtains an authentication key corresponding to the MAC address of the user terminal according to the key query result; and negotiates with the user terminal according to respectively possessed authentication keys to establish an encrypted wireless network connection. Therefore, a problem is resolved that data transmitted by the user terminal to fake public Wi-Fi and data within the user terminal is under security threat when the user terminal accesses the fake public Wi-Fi caused by using an existing access method. Identity authentication is performed on the wireless access point by using the authentication server, and only the trusted wireless access point can obtain the authentication key corresponding to the MAC address of the user terminal, and therefore, establish the encrypted wireless network connection with the user terminal according to the authentication key. The fake public Wi-Fi is not a trusted wireless access point, therefore, the user terminal does not establish a wireless network connection with the fake public Wi-Fi, thereby avoiding leakage of data transmitted by the user terminal and data within the user terminal, and improving data security.

Figure 8:
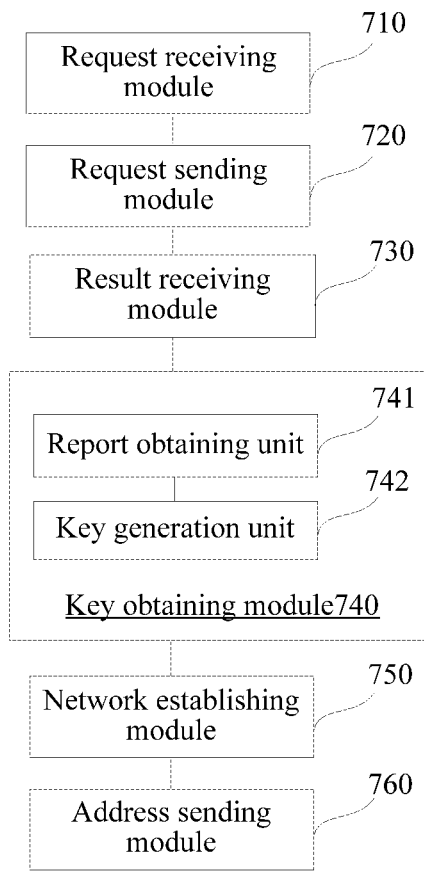
FIG. 8 is a structural block diagram of a wireless network connection apparatus according to another embodiment of the present disclosure.

Referring to FIG. 8, FIG. 8 is a structural block diagram of a wireless network connection apparatus according to another embodiment of the present disclosure. The wireless network connection apparatus may be implemented to be all or a part of the radio access point in FIG. 1 by using software, hardware, or a combination thereof. The wireless network connection apparatus includes: a request receiving module 710, configured to receive an access request sent by a user terminal, the access request carrying a MAC address of the user terminal; a request sending module 720, configured to send a key query request to an authentication server, the key query request carrying the MAC address of the user terminal; a result receiving module 730, configured to receive a key query result that corresponds to the MAC address of the user terminal and that is sent by the authentication server, the key query result being sent by the authentication server when verifying that a wireless access point is a trusted wireless access point after receiving the key query request; and a key obtaining module 740, configured to obtain an authentication key corresponding to the MAC address of the user terminal according to the key query result.

In a first possible implementation, the key obtaining module 740 is further configured to obtain the authentication key that corresponds to the MAC address of the user terminal and that is carried in the key query result.

In a second possible implementation, the key obtaining module 740 may include a report obtaining unit 741 and a key generation unit 742. The report obtaining unit 741 is configured to obtain an error report that corresponds to the MAC address of the user terminal and that is carried in the key query result, the error report being code generated by the authentication server according to the MAC address of the user terminal when the MAC address of the user terminal does not exist in the authentication server. The key generation unit 742 is configured to generate the corresponding authentication key at least according to an identifier of a wireless network corresponding to the wireless access point. A network establishing module 750 is configured to negotiate with the user terminal according to respectively possessed authentication keys to establish an encrypted wireless network connection. In a possible implementation, the wireless network connection apparatus further includes an address sending module 760. The address sending module 760 is configured to send the MAC address of the user terminal to the user terminal, so that the user terminal sends binding information of the user terminal to the authentication server, the binding information including the MAC address of the user terminal and a user name of the user terminal, or the MAC address of the user terminal and a password of the user terminal, or the MAC address of the user terminal, the user name of the user terminal, and the password of the user terminal.

Based on the above, the wireless network connection apparatus provided in this embodiment receives an access request sent by a user terminal; sends a key query request to an authentication server; receives a key query result that corresponds to a MAC address of the user terminal and that is sent by the authentication server; obtains an authentication key corresponding to the MAC address of the user terminal according to the key query result; and negotiates with the user terminal according to respectively possessed authentication keys to establish an encrypted wireless network connection. Therefore, a problem is resolved that data transmitted by the user terminal to fake public Wi-Fi and data within the user terminal is under security threat when the user terminal accesses the fake public Wi-Fi caused by using an existing access method. Identity authentication is performed on the wireless access point by using the authentication server, and only the trusted wireless access point can obtain the authentication key corresponding to the MAC address of the user terminal, and therefore, establish the encrypted wireless network connection with the user terminal according to the authentication key. The fake public Wi-Fi is not a the trusted wireless access point, therefore, the user terminal does not establish a wireless network connection with the fake public Wi-Fi, thereby avoiding leakage of data transmitted by the user terminal and data within the user terminal, and improving data security. In addition, the authentication server and the wireless access point transmit data to each other through an encrypted channel, thereby improving data security during transmission.

In addition, when the authentication server does not pre-store the MAC address of the user terminal, the user terminal and the wireless access point respectively generate corresponding authentication keys at least according to the identifier of the wireless network corresponding to the wireless access point, and establish the encrypted wireless network connection according to the possessed authentication keys, thereby improving security of the process of the wireless network connection, and security of exchanging data after the wireless network is connected.

Figure 9:
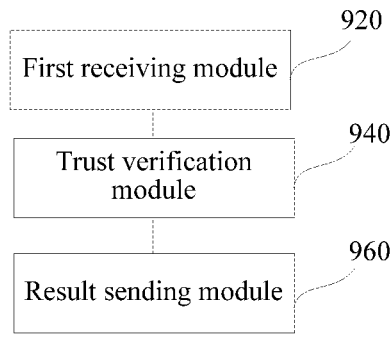
FIG. 9 is a structural block diagram of a wireless network connection apparatus according to an embodiment of the present disclosure.

Referring to FIG. 9, FIG. 9 is a structural block diagram of a wireless network connection apparatus according to an embodiment of the present disclosure. The wireless network connection apparatus may be implemented to be all or a part of the authentication server in FIG. 1 by using software, hardware, or a combination thereof. The wireless network connection apparatus includes: a first receiving module 920, configured to receive a key query request sent by a wireless access point, the key query request carrying a MAC address of a user terminal; a trust verification module 940, configured to verify whether the wireless access point is a trusted wireless access point after the key query request is received; and a result sending module 960, configured to send a key query result corresponding to the MAC address of the user terminal to the wireless access point when the wireless access point is a trusted wireless access point, so that the wireless access point obtains an authentication key corresponding to the MAC address of the user terminal according to the key query result, and negotiates with the user terminal according to respectively possessed authentication keys to establish an encrypted wireless network connection.

Based on the above, the wireless network connection apparatus provided in this embodiment receives a key query request sent by a wireless access point; verifies whether the wireless access point is a trusted wireless access point after the key query request is received; and sends a key query result corresponding to the MAC address of the user terminal to the wireless access point when the wireless access point is a trusted wireless access point. Therefore, a problem is resolved that data transmitted by the user terminal to fake public Wi-Fi and data within the user terminal is under security threat when the user terminal accesses the fake public Wi-Fi caused by using an existing access method. Identity authentication is performed on the wireless access point by using the authentication server, and only the trusted wireless access point can obtain the authentication key corresponding to the MAC address of the user terminal, and therefore, establish the encrypted wireless network connection with the user terminal according to the authentication key. The fake public Wi-Fi is not a trusted wireless access point, therefore, the user terminal does not establish a wireless network connection with the fake public Wi-Fi, thereby avoiding leakage of data transmitted by the user terminal and data within the user terminal, and improving data security.

Figure 10:
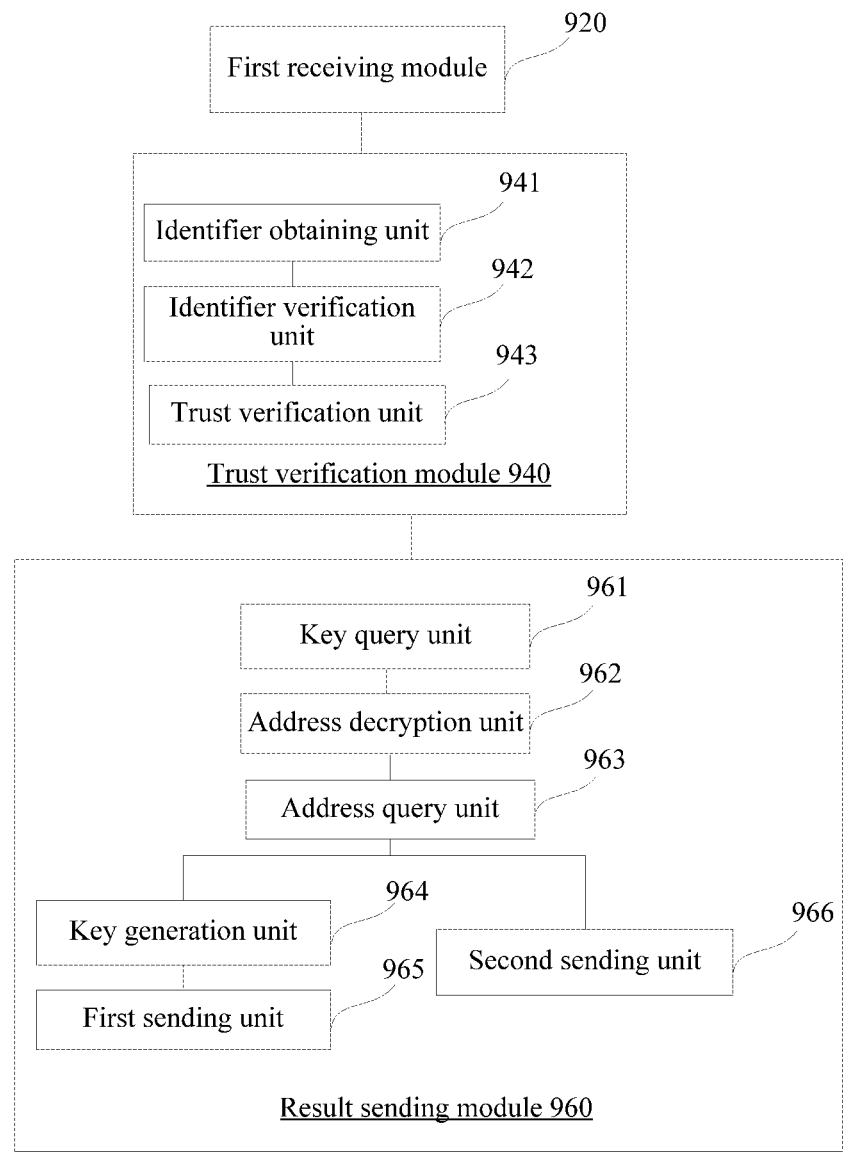
FIG. 10 is a structural block diagram of a wireless network connection apparatus according to another embodiment of the present disclosure.

Referring to FIG. 10, FIG. 10 is a structural block diagram of a wireless network connection apparatus according to an embodiment of the present disclosure. The wireless network connection apparatus may be implemented to be all or a part of the authentication server in FIG. 1 by using software, hardware, or a combination thereof. The wireless network connection apparatus includes:

A first receiving module 920 is configured to receive a key query request sent by a wireless access point, the key query request carrying a MAC address of a user terminal. A trust verification module 940 is configured to verify whether the wireless access point is a trusted wireless access point after the key query request is received. In a possible implementation, the trust verification module 940 may include: an identifier obtaining unit 941, an identifier verification unit 942, and a trust verification unit 943. The identifier obtaining unit 941 is configured to obtain a first ciphertext and an identifier of the wireless access point that are carried in the key query request. The identifier verification unit 942 is configured to verify whether the identifier of the wireless access point is a trusted identifier. The trust verification unit 943 is configured to verify the wireless access point as the trusted wireless access point if the identifier of the wireless access point is a trusted identifier. The trusted identifier is an identifier of a wireless access point on which identity authentication performed by the authentication server succeeds, and the first ciphertext includes the MAC address of the user terminal. The result sending module 960 is configured to send a key query result corresponding to the MAC address of the user terminal to the wireless access point when the wireless access point is a trusted wireless access point, so that the wireless access point obtains an authentication key corresponding to the MAC address of the user terminal according to the key query result, and negotiates with the user terminal according to respectively possessed authentication keys to establish an encrypted wireless network connection. In a first possible implementation, the result sending module 960 may include: a key query unit 961, an address decryption unit 962, an address query unit 963, a key generation unit 964, and a first sending unit 965. The key query unit 961 is configured to query for a session key corresponding to the identifier of the wireless access point when the wireless access point is a trusted wireless access point. The address decryption unit 962 is configured to decrypt the first ciphertext carried in the key query request by using the session key corresponding to the identifier of the wireless access point, to obtain the MAC address of the user terminal. The address query unit 963 is configured to query an address list to determine whether the MAC address of the user terminal exists. The key generation unit 964 is configured to generate the authentication key corresponding to the MAC address of the user terminal at least according to the MAC address of the user terminal and an identifier of a wireless network corresponding to the wireless access point when the MAC address of the user terminal exists. The first sending unit 965 is configured to send the key query result to the wireless access point, the key query result carrying the authentication key corresponding to the MAC address of the user terminal. The first ciphertext is a ciphertext through which the wireless access point encrypts the MAC address of the user terminal by using the session key corresponding to the identifier of the wireless access point; the session key corresponding to the identifier of the wireless access point is stored in the authentication server when the wireless access point is registered successfully; and the address list is a list of MAC addresses of the user terminal stored in the authentication server when the user terminal is registered successfully.

In a second possible implementation, the result sending module 960 may include: a key query unit 961, an address decryption unit 962, an address query unit 963, and a second sending unit 966. The second sending unit 966 is configured to send the key query result to the wireless access point if the MAC address of the user terminal does not exist, the key query result carrying an error report corresponding to the MAC address of the user terminal. The error report is code generated by the authentication server according to the MAC address of the user terminal when the MAC address of the user terminal does not exist.

Based on the above, the wireless network connection apparatus provided in this embodiment receives a key query request sent by a wireless access point; verifies whether the wireless access point is a trusted wireless access point after the key query request is received; and sends a key query result corresponding to the MAC address of the user terminal to the wireless access point when the wireless access point is a trusted wireless access point. Therefore, a problem is resolved that data transmitted by the user terminal to fake public Wi-Fi and data within the user terminal is under security threat when the user terminal accesses the fake public Wi-Fi caused by using an existing access method. Identity authentication is performed on the wireless access point by using the authentication server, and only the trusted wireless access point can obtain the authentication key corresponding to the MAC address of the user terminal, and therefore, establish the encrypted wireless network connection with the user terminal according to the authentication key. The F]fake public Wi-Fi is not a trusted wireless access point, therefore, the user terminal does not establish a wireless network connection with the fake public Wi-Fi, thereby avoiding leakage of data transmitted by the user terminal and data within the user terminal, and improving data security.

In addition, when the authentication server does not pre-store the MAC address of the user terminal, the user terminal and the wireless access point respectively generate corresponding authentication keys at least according to the identifier of the wireless network corresponding to the wireless access point, and establish the encrypted wireless network connection according to the possessed authentication keys, thereby improving security of the process of the wireless network connection, and security of exchanging data after the wireless network is connected.

In some embodiments, when the wireless network connection apparatus provided in the foregoing embodiments connects to a wireless network, it is illustrated with an example of division of the foregoing function modules. In embodiments of the present disclosure, the foregoing functions may be allocated to and completed by different function modules according to requirements, that is, the internal structure of the apparatus is divided into different function modules, to complete all or part of the functions described above. In addition, the wireless network connection apparatus provided by the foregoing embodiments and the wireless network connection method embodiments belong to one concept. For a specific implementation process referring to the method embodiments, the details are not described herein again.

Figure 11:
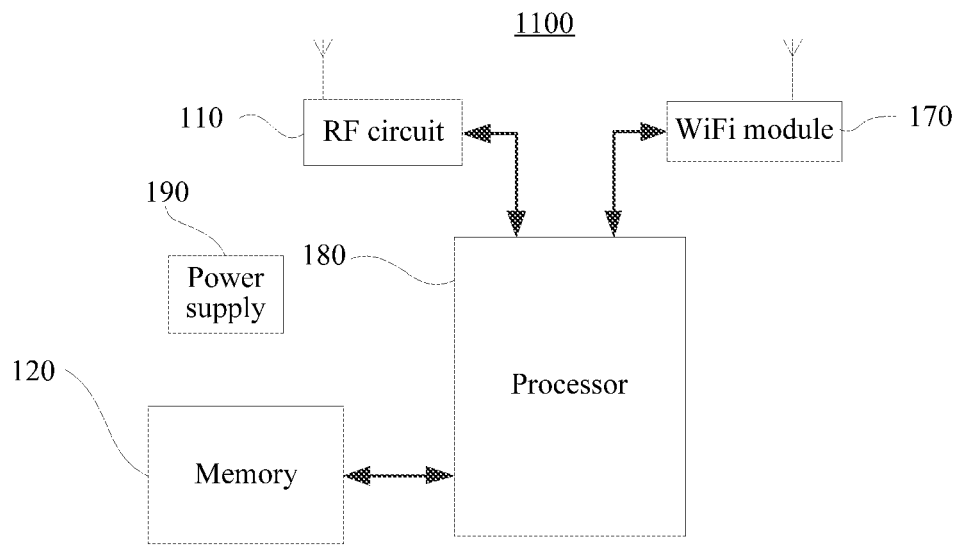
FIG. 11 is a schematic structural diagram of a wireless access point according to an embodiment of the present disclosure.

Referring to FIG. 11, FIG. 11 is a schematic structural diagram of a wireless access point according to an embodiment of the present disclosure. The wireless access point may be used to implement functions performed by the wireless access point in the wireless network connection method shown in the foregoing embodiments. Referring to FIG. 11, the wireless access point includes:

A wireless access point 1100 may include components, such as a radio frequency (RF) circuit 110, a memory 120 including one or more computer readable storage media, a transmission module 170, a processor 180 including one or more processing cores, and a power supply 190. A person skilled in the art may understand that the structure of the wireless access point shown in FIG. 14 does not constitute a limitation to the wireless access point, and the wireless access point may include more or fewer components than those shown in the figure, or some components may be combined, or a different component deployment may be used.

The RF circuit 110 may be configured to receive and send signals during an information receiving and sending process or a call process. Particularly, the RF circuit delivers the received information to one or more processors 180 for processing. Generally, the RF circuit 110 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 110 may also communicate with a network and another wireless access point by wireless communication. The wireless communication may use any communications standard or protocol, including but not limited to a WiFi protocol.

The memory 120 may be configured to store a software program and module, for example, a software program and module corresponding to the wireless access point shown in the foregoing exemplary embodiments. The processor 180 runs the software program and module stored in the memory 120, to implement various functional applications and data processing, for example, to implement exchange based on video data. The memory 120 may mainly include a program storage area and a data storage area. The program storage area may store an operating system, an application program required by at least one function, and the like. The data storage area may store data (such as a routing table and data related to a user terminal) created according to use of the wireless access point 1100, and the like. In addition, the memory 120 may include a high speed random access memory, and may further include a non-volatile memory, such as at least one magnetic disk storage device, a flash memory, or another volatile solid-state storage device. Correspondingly, the memory 120 may further include a memory controller, to provide access of the processor 180 and the input unit 130 to the memory 120.

The wireless access point 1100 may perform information exchange, such as web page information or audio/video data exchange, with a user terminal and an authentication server by using the transmission module 170, and provide a wireless or fixed wire wideband Internet access for a user. Although FIG. 11 shows the transmission module 170, it may be understood that the transmission module 170 is not a necessary component of the wireless access point 1100, and when required, the transmission module 170 may be omitted as long as the scope of the essence of the present disclosure is not changed.

The processor 180 is a control center of the wireless access point 1100, is connected to various parts of the entire wireless access point by using various interfaces and lines, and by running or executing a software program and/or module stored in the memory 120, and invoking the data stored in the memory 120, perform various functions of the wireless access point 1100 and process data, so as to perform overall monitoring on the wireless access point. Optionally, the processor 180 may include one or more processor cores. Preferably, the processor 180 may integrate an application processor and a modem processor. The application processor mainly processes an operating system, a user interface, an application program, and the like. The modem processor mainly processes wireless communication. It may be understood that the foregoing modem processor may alternatively not be integrated into the processor 180. In embodiments of the present disclosure, a functional module may refer to one or more computer programs stored in a memory or other computer storage medium, such as memory 120. When executed by one or more processors, such as processor 180, the computer programs may implement the functions of the corresponding functional module. Further, a functional module in embodiments of the present disclosure may be implemented by a combination of software and hardware components to implement the functions of the module.

The wireless access point 1100 further includes the power supply 190 (such as a battery) for supplying power to the components. Preferably, the power supply may be logically connected to the processor 180 by using a power management system, thereby implementing functions such as charging, discharging and power consumption management by using the power management system. The power supply 190 may further include one or more of a direct current or alternating current power supply, a re-charging system, a power failure detection circuit, a power supply converter or inverter, a power supply state indicator, and any other components.

Although not shown in the figure, the wireless access point 1100 may further include a Bluetooth module, and the like, which are not further described herein. Specifically, in this embodiment of the present disclosure, the wireless access point further includes a memory, and one or more programs. The one or more programs are stored in the memory and are configured to be executed by one or more processors, and the one or more programs include instructions used for performing operations performed by the wireless access point in the foregoing embodiments.

In an exemplary embodiment, a non-transitory computer readable storage medium including an instruction is further provided, for example, a memory including an instruction, and the foregoing instruction may be executed by a processor of a mobile wireless access point to complete the foregoing wireless network connection method. For example, the non-transitory computer readable storage medium may be a ROM, a random access memory (RAM), a CD-ROM, a magnetic tape, a floppy disk, or an optical data storage device.

Figure 12:
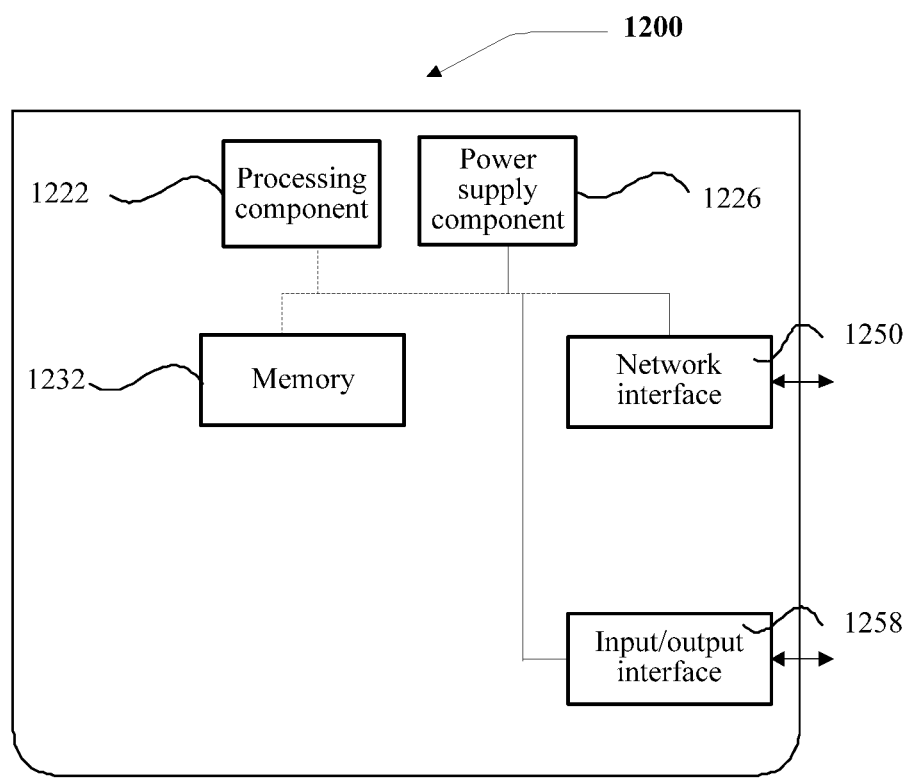
FIG. 12 is a schematic structural diagram of a server according to an embodiment of the present disclosure.

Referring to FIG. 12, FIG. 12 is a schematic structural diagram of a server according to an embodiment of the present disclosure. The server may be provided as the authentication server in the foregoing wireless network connection method, to implement functions performed by the wireless access point in the wireless network connection method shown in the foregoing embodiments. Referring to FIG. 12, the server includes a processing component 1222, and the server further includes one or more processors, and a memory resource represented by a memory 1232. The memory resource is used for storing an instruction that can be executed by the processing component 1222, for example, an application program. The application program stored in the memory 1232 may include one or more modules each of which corresponding to a set of instructions. In addition, the processing component 1222 is configured to execute instructions, to perform the method performed by the authentication server in the wireless network connection method embodiments.

The server 1200 may further include a power supply component 1226, configured to perform power supply management of the server 1200, a fixed wire or wireless network interface 1250, configured to connect the server 1200 to a network, and an input/output (I/O) interface 1258. The server 1200 may operate an operating system that is stored in the memory 1232, for example, Windows Server™, Mac OS X™, Unix™, Linux™, or FreeBSD™.

In an exemplary embodiment, a non-transitory computer readable storage medium including an instruction is further provided, for example, a memory including an instruction, and the foregoing instruction may be executed by a processor in a server to complete the wireless network connection method in the foregoing embodiments. For example, the non-transitory computer readable storage medium may be a ROM, a random access memory (RAM), a CD-ROM, a magnetic tape, a floppy disk, or an optical data storage device.

Figure 13:
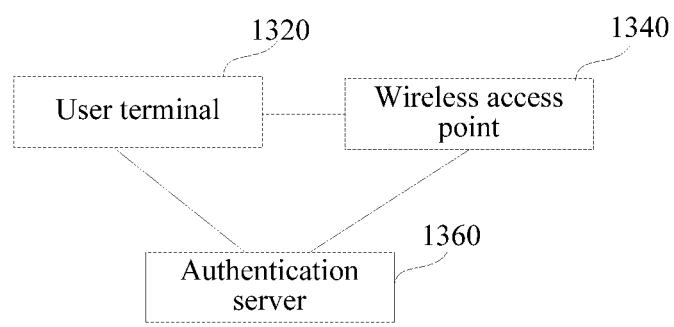
FIG. 13 is a structural block diagram of a wireless network connection system according to an embodiment of the present disclosure.

Referring to FIG. 13, FIG. 13 is a structural block diagram of a wireless network connection system according to an embodiment of the present disclosure. The system includes: a user terminal 1320, a wireless access point 1340, and an authentication server 1360.

The user terminal 1320 is configured to send an access request to the wireless access point.

The wireless access point 1340 includes the wireless network connection apparatus described according to any of the embodiment shown in FIG. 7 and the embodiment shown in FIG. 8, and the authentication server 1360 includes the wireless network connection apparatus described according to any of the embodiment shown in FIG. 9 and the embodiment shown in FIG. 10. Alternatively, the wireless access point 1340 includes the wireless access point shown in the embodiment shown in FIG. 11, and the authentication server 1360 includes the authentication server shown in the embodiment shown in FIG. 12.

The sequence numbers of the preceding embodiments of the present disclosure are merely for description purpose but do not indicate the preference of the embodiments.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A wireless network connection method, the method comprising:

receiving, from a user terminal, an access request to a wireless access point providing public Wi-Fi, the access request including a media access control MAC address of the user terminal;

after receiving the access request from the user terminal, sending, by the wireless access point, a key query request to an authentication server, the key query request including the MAC address of the user terminal and an identifier of the wireless access point;

determining, by the authentication server, the identifier of the wireless access point as a trusted identifier by performing identity authentication;

in response to determining by the authentication server the identifier of the wireless access point is the trusted identifier, sending to the wireless access point, by the authentication server, a key query result corresponding to the MAC address of the user terminal;

obtaining, by the wireless access point, a first authentication key corresponding to the MAC address of the user terminal according to the key query result; and negotiating, by the wireless access point, with the user terminal, according to the first authentication key and a second authentication key, to establish an encrypted wireless network connection, wherein the second authentication key is generated by the user terminal corresponding to the MAC address of the user terminal; and in response to determining by the authentication server the identifier of the wireless access point is not the trusted identifier, receiving from the user terminal, by the authentication server, a coordinate address of the user terminal;

detecting, by the authentication server, one or more trusted wireless access points available at the coordinate address of the user terminal;

displaying on a user interface of the user terminal, by the user terminal, the one or more trusted wireless access points sent from the authentication server, and displaying on the user interface of the user terminal, by the user terminal, one or more non-trusted wireless access points;

differently marking, by the user terminal, the one or more trusted and non-trusted wireless access points to differentiate the one or more trusted wireless access points away from the one or more non-trusted wireless access points; and connecting, by the user terminal, to one of the one or more trusted wireless access points.

2. The method according to claim 1, wherein the key query request further includes a first ciphertext, the first ciphertext including the MAC address of the user terminal, and wherein the authentication server decrypts the key query request by using a private key corresponding to the authentication server, to obtain the first ciphertext and the identifier of the wireless access point, the key query request being a request of encrypting, by the wireless access point, the first ciphertext and the identifier of the wireless access point by using a public key corresponding to the authentication server.

3. The method according to claim 1, wherein the key query request further includes a first ciphertext, the first ciphertext including the MAC address of the user terminal, and wherein the authentication server:

queries for a session key corresponding to the identifier of the wireless access point;

decrypts the first ciphertext carried in the key query request by using the session key corresponding to the identifier of the wireless access point, to obtain the MAC address of the user terminal;

queries an address list to determine whether the MAC address of the user terminal is registered;

generates the first authentication key corresponding to the MAC address of the user terminal; and sends the key query result to the wireless access point, the key query result including the first authentication key corresponding to the MAC address of the user terminal.

4. The method according to claim 3, further comprising:

obtaining, by the user terminal, the identifier of the wireless network corresponding to the wireless access point; and generating, by the user terminal, the second authentication key at least according to the identifier of the wireless network corresponding to the wireless access point and the MAC address of the user terminal.

5. The method according to claim 1, wherein the key query request further includes a first ciphertext, the first ciphertext including the MAC address of the user terminal, and wherein the authentication server:

queries for a session key corresponding to the identifier of the wireless access point;

decrypts the first ciphertext carried in the key query request by using the session key corresponding to the identifier of the wireless access point, to obtain the MAC address of the user terminal;

queries an address list to determine whether the MAC address of the user terminal is not registered; and sends the key query result to the wireless access point, the key query result including an error report corresponding to the MAC address of the user terminal, the error report being code generated by the authentication server when the MAC address of the user terminal is not stored in the authentication server.

6. The method according to claim 5, further comprising:

receiving, by the wireless access point, the key query result sent by the authentication server; and generating, by the wireless access point after obtaining the error report, the first authentication key at least according to an identifier of a wireless network corresponding to the wireless access point.

7. The method according to claim 5, further comprising:

obtaining, by the user terminal, an identifier of a wireless network corresponding to the wireless access point; and generating, by the user terminal, the second authentication key at least according to the identifier of the wireless network corresponding to the wireless access point.

8. The method according to claim 1, wherein the authentication server performs a first encryption on the key query result by using a session key corresponding to the identifier of the wireless access point, and sends the key query result on which the first encryption is performed to the wireless access point.

9. The method according to claim 8, wherein the authentication server, by using a private key corresponding to the authentication server, performs a second encryption on the key query result on which the first encryption is performed, and sends the key query result on which the second encryption is performed to the wireless access point.

10. The method according to claim 9, further comprising:

decrypting, by the wireless access point by using a public key corresponding to the authentication server, the key query result on which the second encryption is performed, to obtain a second ciphertext, the second ciphertext being a ciphertext through which the authentication server encrypts the key query result by using the session key corresponding to the identifier of the wireless access point; and decrypting, by the wireless access point, the second ciphertext by using the session key corresponding to the identifier of the wireless access point, to obtain the first authentication key that corresponds to the MAC address of the user terminal and that is included in the key query result.

11. The method according to claim 1, further comprising:

sending, by the wireless access point, an identity authentication request to the authentication server, the identity authentication request including authentication information and the identifier of the wireless access point, wherein both the authentication information and the identifier of the wireless access point are encrypted by using a public key corresponding to the authentication server, and the authentication information includes at least hardware information, and wherein the authentication server decrypts the identity authentication request by using a private key corresponding to the authentication server, to obtain the authentication information and the identifier of the wireless access point.

12. The method according to claim 11, further comprising:

prior to receiving the access request from the user terminal, sending, by the wireless access point, a registration request to the authentication server, the registration request including hardware information of the wireless access point, wherein the authentication server generates the identifier of the wireless access point and a session key corresponding to the identifier of the wireless access point according to the registration request, and sends the identifier of the wireless access point and the session key to the wireless access point.

13. The method according to claim 12, wherein determining by the authentication server the identifier of the wireless access point as the trusted identifier comprises:
querying, by the authentication server, for the session key corresponding to the identifier of the wireless access point according to the identifier of the wireless access point;
decrypting, by the authentication server, the authentication information by using the session key corresponding to the identifier of the wireless access point, to obtain the hardware information and to perform identity authentication on the hardware information; and
determining, by the authentication server, the identifier of the wireless access point as the trusted identifier.

14. The method according to claim 1, further comprising:
negotiating, by the wireless access point with the user terminal, by using the first and second authentication keys, to generate a temporary key; and
establishing the encrypted wireless network connection by using the temporary key.

15. The method according to claim 1, further comprising:
prior to receiving from the user terminal the access request, establishing registration of the wireless access point with the authentication server to generate a session key corresponding to the identifier of the wireless access point; and
after the access request has been received from the user terminal, and prior to sending the key query result, performing the identify authentication of the wireless access point by using a combination of the session key and a public key and a private key, wherein the session key is possessed and kept confidential by both the authentication server and the wireless access point.

16. The method according to claim 15, wherein the registration is implemented using the session key of an application layer, and wherein the identity authorization is implemented using the session key of the application layer and using the public key and the private key of a transmission layer.

17. The method according to claim 1, further comprising:
receiving, by the authentication server through an independent channel, an information registration request from the user terminal, wherein the independent channel is a communication channel through which the user terminal directly communicates with the authentication server, bypassing the wireless access point, and wherein the information registration request includes the MAC address of the user terminal.

18. The method according to claim 17, wherein the information registration request further includes a coordinate address and a current time, the coordinate address is an address on which the user terminal is located when sending the information registration request, and the current time is time when the user terminal sends the information registration request.

19. The method according to claim 1, in response to determining by the authentication server the identifier of the wireless access point is not the trusted identifier, further comprising:

determining, by the authentication server, that the wireless access point is a fake public Wi-Fi and that a wireless network connection with the fake public Wi-Fi is not authorized.

20. A wireless network connection apparatus, comprising:
one or more processors configured to perform:
receiving an access request sent by a user terminal, the access request including a media access control MAC address of the user terminal;
after receiving the access request from the user terminal, sending a key query request to an authentication server, the key query request including the MAC address of the user terminal and an identifier of the wireless access point;
obtaining determination performed by the authentication server on the identifier of the wireless access point being a trusted identifier;
in response to obtaining determination by the authentication server that the identifier of the wireless access point is the trusted identifier,
receiving a key query result that corresponds to the MAC address of the user terminal from the authentication server;
obtaining an authentication key corresponding to the MAC address of the user terminal according to the key query result; and
negotiating with the user terminal according to respectively possessed authentication keys to establish an encrypted wireless network connection; and in response to determining by the authentication server the identifier of the wireless access point is not the trusted identifier,
receiving from the user terminal, by the authentication server, a coordinate address of the user terminal;
detecting, by the authentication server, one or more trusted wireless access points available at the coordinate address of the user terminal;
displaying on a user interface of the user terminal, by the user terminal, the one or more trusted wireless access points sent from the authentication server, and displaying on the user interface of the user terminal, by the user terminal, one or more non-trusted wireless access points;
differently marking, by the user terminal, the one or more trusted and non-trusted wireless access points to differentiate the one or more trusted wireless access points away from the one or more non-trusted wireless access points; and
connecting, by the user terminal, to one of the one or more trusted wireless access points.

21. The apparatus according to claim 20, wherein the one or more processors are configured to perform:
obtaining an error report from the key query result, the error report corresponding to the MAC address of the user terminal and indicating the MAC address of the user terminal does not exist in the authentication server.

22. A non-transitory computer-readable storage medium storing computer program instructions executable by at least one processor to perform:
receiving an access request sent by a user terminal, the access request including a media access control MAC address of the user terminal;
in response to receiving the access request from the user terminal, sending a key query request to an authentication server, the key query request including the MAC address of the user terminal and an identifier of a wireless access point providing public Wi-Fi;

obtaining determination performed by the authentication server on the identifier of the wireless access point being a trusted identifier;

after obtaining determination by the authentication server that the identifier of the wireless access point is the trusted identifier,
- receiving a key query result that corresponds to the MAC address of the user terminal from the authentication server;
- obtaining an authentication key corresponding to the MAC address of the user terminal according to the key query result; and
- negotiating with the user terminal according to respectively possessed authentication keys to establish an encrypted wireless network connection; and in response to determining by the authentication server the identifier of the wireless access point is not the trusted identifier,
- receiving from the user terminal, by the authentication server, a coordinate address of the user terminal;
- detecting, by the authentication server, one or more trusted wireless access points available at the coordinate address of the user terminal;
- displaying on a user interface of the user terminal, by the user terminal, the one or more trusted wireless access points sent from the authentication server, and displaying on the user interface of the user terminal, by the user terminal, one or more non-trusted wireless access points;
- differently marking, by the user terminal, the one or more trusted and non-trusted wireless access points to differentiate the one or more trusted wireless access points away from the one or more non-trusted wireless access points; and
- connecting, by the user terminal, to one of the one or more trusted wireless access points.

\* \* \* \* \*